(12) United States Patent
Hasegawa

(10) Patent No.: US 8,947,485 B2
(45) Date of Patent: Feb. 3, 2015

(54) DRAWING CONTROL DEVICE, LASER-LIGHT EMITTING SYSTEM, DRAWING METHOD, AND COMPUTER PROGRAM PRODUCT

(75) Inventor: Fumihiro Hasegawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1136 days.

(21) Appl. No.: 12/912,118

(22) Filed: Oct. 26, 2010

(65) Prior Publication Data

US 2011/0096040 A1  Apr. 28, 2011

(30) Foreign Application Priority Data

Oct. 27, 2009 (JP) ................ 2009-246720
Aug. 17, 2010 (JP) ................ 2010-182371

(51) Int. Cl.

| B41J 2/435 | (2006.01) |
|---|---|
| B41J 2/47 | (2006.01) |
| B41J 2/32 | (2006.01) |
| G06K 15/12 | (2006.01) |
| B41J 2/475 | (2006.01) |
| G06K 15/02 | (2006.01) |

(52) U.S. Cl.
CPC ........... *G06K 15/1276* (2013.01); *B41J 2/4753* (2013.01); *G06K 15/1855* (2013.01)
USPC ........... 347/231; 347/224; 347/246; 347/247; 347/236; 347/237; 347/240; 347/232; 347/225; 347/171

(58) Field of Classification Search
USPC ......... 347/231, 224, 171, 225, 232, 236–237, 347/240, 246–247
See application file for complete search history.

(56) References Cited

U.S. PATENT DOCUMENTS

| 6,629,743 B2 | 10/2003 | Chikuma et al. |
|---|---|---|
| 8,106,934 B2 | 1/2012 | Ishimi et al. |
| 2002/0021317 A1 | 2/2002 | Chikuma et al. |
| 2004/0223189 A1 | 11/2004 | Bhattacharjya |

(Continued)

FOREIGN PATENT DOCUMENTS

| CN | 1117155 A | 2/1996 |
|---|---|---|
| CN | 101037053 A | 9/2007 |

(Continued)

OTHER PUBLICATIONS

Extended European Search Report issued Jan. 17, 2014 in Patent Application No. 10188927.7.

(Continued)

*Primary Examiner* — Sarah Al Hashimi
(74) *Attorney, Agent, or Firm* — Oblon, Spivak, McClelland, Maier & Neustadt, L.L.P.

(57) ABSTRACT

A drawing control device includes: a fill-stroke generating unit that generates a fill stroke that includes a plurality of strokes that fill a drawing area; a shape-stroke generating unit that generates a shape stroke which is a stroke of a shape to be formed on the drawing area; a first detecting unit that detects an overlap portion where the fill stroke and the shape stroke overlap with each other; a modifying unit that removes the overlap portion from the fill stroke to modify the fill stroke to obtain a drawing stroke; a drawing-instruction generating unit that generates a drawing instruction for drawing each stroke in the drawing stroke; and a drawing control unit that controls a drawing device by using the drawing instruction to cause the drawing device to draw the drawing stroke on an object.

14 Claims, 25 Drawing Sheets

(56) References Cited

U.S. PATENT DOCUMENTS

| | | |
|---|---|---|
| 2007/0225162 A1 | 9/2007 | Kawahara et al. |
| 2007/0279474 A1 | 12/2007 | Sato |
| 2008/0023455 A1 | 1/2008 | Idaka et al. |
| 2010/0039916 A1 | 2/2010 | Hasegawa et al. |

FOREIGN PATENT DOCUMENTS

| | | |
|---|---|---|
| CN | 101112735 A | 1/2008 |
| CN | 101219609 A | 7/2008 |
| EP | 1 174 273 A1 | 1/2002 |
| EP | 1 758 045 A1 | 2/2007 |
| EP | 1758045 A1 * | 2/2007 |
| JP | 64-13588 | 1/1989 |
| JP | 6-274142 | 9/1994 |
| JP | 2002-334341 A | 11/2002 |
| JP | 2004-334884 A | 11/2004 |
| JP | 2005-310048 | 11/2005 |
| WO | WO 2008/117585 A1 | 10/2008 |
| WO | WO 2008117585 A1 * | 10/2008 |

OTHER PUBLICATIONS

Combined Chinese Office Action and Search Report issued Sep. 26, 2012 in Patent Application No. 2010105239326 with English Translation.

* cited by examiner

| FILL STROKE DATA |
|---|
| (100, 100) TO (500, 100)<br>(100, 140) TO (500, 140)<br>(100, 180) TO (500, 180) |

| SHAPE STROKE DATA |
|---|
| (100, 50) TO (100, 500)<br>(100, 220) TO (230, 50)<br>(230, 50) TO (300, 50)<br>(300, 50) TO (400, 100) |

| t | 40 | |
| m | 100 | 100 |
| d | 1200 | 100 |
| m | 100 | 140 |
| w | 50 | |
| d | 180 | 140 |
| m | 500 | 140 |
| d | 610 | 140 |
| m | 680 | 140 |
| d | 1200 | 140 |
| m | 100 | 180 |
| w | 50 | |
| : | | | t: SET LINE WIDTH m: MOVE TO SPECIFIED COORDINATE POSITION d: DRAW STROKE TO SPECIFIED COORDINATE POSITION w: ON STANDBY FOR SPECIFIED PERIOD OF TIME

| | | |
|---|---|---|
| t | 40 | |
| m | 100 | 100 |
| p | 105 | |
| d | 1200 | 100 |
| m | 100 | 140 |
| w | 50 | |
| d | 103 | 140 |
| p | 100 | |
| d | 180 | 140 |
| m | 500 | 140 |
| | ⋮ | |
| d | 580 | 260 |
| p | 105 | |
| d | 610 | 260 |
| m | 680 | 260 |
| d | 683 | 260 |
| p | 100 | |
| | ⋮ | | t: SET LINE WIDTH m: MOVE TO SPECIFIED COORDINATE POSITION d: DRAW STROKE TO SPECIFIED COORDINATE POSITION w: ON STANDBY FOR SPECIFIED PERIOD OF TIME p: CHANGE LASER IRRADIATION INTENSITY

| | | |
|---|---|---|
| t | 40 | |
| m | 100 | 100 |
| d | 1200 | 100 |
| m | 100 | 140 |
| w | 50 | |
| d | 180 | 140 |
| m | 500 | 140 |
| ⋮ | | |
| w | 300 | |
| m | 180 | 100 |
| w | 50 | |
| d | 520 | 100 |
| ⋮ | | |

DRAWING INSTRUCTION FOR DRAWING STROKE

DRAWING INSTRUCTION FOR OUTLINE STROKE t: SET LINE WIDTH m: MOVE TO SPECIFIED COORDINATE POSITION d: DRAW STROKE TO SPECIFIED COORDINATE POSITION w: ON STANDBY FOR SPECIFIED PERIOD OF TIME

DRAWING CONTROL DEVICE, LASER-LIGHT EMITTING SYSTEM, DRAWING METHOD, AND COMPUTER PROGRAM PRODUCT

CROSS-REFERENCE TO RELATED APPLICATIONS

The present application claims priority to and incorporates by reference the entire contents of Japanese Patent Application No. 2009-246720 filed in Japan on Oct. 27, 2009 and Japanese Patent Application No. 2010-182371 filed in Japan on Aug. 17, 2010.

BACKGROUND OF THE INVENTION

1. Field of the Invention

The present invention relates to a drawing control device, a laser-light emitting system, a drawing method, and a computer program product.

2. Description of the Related Art

Laser markers, as is known in the art, write a shape such as a character or a symbol, on an object such as a thermal rewritable medium or a metal, by illuminating the object with laser light. Such laser markers are widely used in various fields. In a physical distribution system, for example, a laser marker is used to print a name of goods and a destination of goods on a thermal rewritable medium that is attached to a container or the like.

It is often requested to write a shape on an object in a brightness-inverted manner, or, equivalently, such that brightness of a shape portion is inverted and brightness of a background portion is inverted, in order for the shape on the object to be highly visible. For instance, Japanese Patent Application Laid-open No. 2005-310048 discloses a technique of inverting brightness of code symbols of a two-dimensional code to generate brightness-inverted code symbols, further converting the brightness-inverted code symbols into marking data, such as dot data or scan data, and then marking the brightness-inverted two-dimensional code on a work piece, with laser by using the marking data.

However, the conventional technique described above requires rasterization for conversion into marking data, such as dot data or scan data. In addition, the brightness-inverted shape has to be drawn using a raster scan method because the marking data, such as dot data or scan data, is used for drawing. Accordingly, the conventional technique requires a large amount of processing to draw the brightness-inverted shape, which renders the drawing time consuming.

In view of the above circumstances, an object of the present invention is to provide a drawing control device capable of drawing a brightness-inverted shape with reduced drawing time, a laser-light emitting system, a drawing method, and a computer program product.

SUMMARY OF THE INVENTION

It is an object of the present invention to at least partially solve the problems in the conventional technology.

According to one aspect of the present invention, there is provided a drawing control device including: a fill-stroke generating unit that generates a fill stroke that includes a plurality of strokes that fill a drawing area; a shape-stroke generating unit that generates a shape stroke which is a stroke of a shape to be formed on the drawing area; a first detecting unit that detects an overlap portion where the fill stroke and the shape stroke overlap with each other; a modifying unit that removes the overlap portion from the fill stroke to modify the fill stroke to obtain a drawing stroke; a drawing-instruction generating unit that generates a drawing instruction for drawing each stroke in the drawing stroke; and a drawing control unit that controls a drawing device by using the drawing instruction to cause the drawing device to draw the drawing stroke on an object, the drawing device being a device for drawing visual information on the object by transferring energy to the object.

According to another aspect of the present invention, there is provided a drawing method including: generating, by a fill-stroke generating unit, a fill stroke that includes a plurality of strokes that fill a drawing area; generating, by a shape-stroke generating unit, a shape stroke which is a stroke of a shape to be formed on the drawing area; detecting, by a first detecting unit, an overlap portion where the fill stroke and the shape stroke overlap with each other; modifying, by a modifying unit, the fill stroke to obtain a drawing stroke by removing the overlap portion from the fill stroke; generating, by a drawing-instruction generating unit, a drawing instruction for drawing each stroke in the drawing stroke; and controlling, by a drawing control unit, a drawing device by using the drawing instruction to cause the drawing device to draw the drawing stroke on an object, the drawing device being a device for drawing visual information on the object by transferring energy to the object.

According to still another aspect of the present invention, there is provided a computer program product including a computer-usable medium having computer-readable program codes embodied in the medium for processing information in a drawing control device that includes a fill-stroke generating unit, a shape-stroke generating unit, a first detecting unit, a modifying unit, a drawing-instruction generating unit, and a drawing control unit, the program codes when executed causing a computer to execute: generating, by a fill-stroke generating unit, a fill stroke that includes a plurality of strokes that fill a drawing area; generating, by a shape-stroke generating unit, a shape stroke which is a stroke of a shape to be formed on the drawing area; detecting, by a first detecting unit, an overlap portion where the fill stroke and the shape stroke overlap with each other; modifying, by a modifying unit, the fill stroke to obtain a drawing stroke by removing the overlap portion from the fill stroke; generating, by a drawing-instruction generating unit, a drawing instruction for drawing each stroke in the drawing stroke; and controlling, by a drawing control unit, a drawing device by using the drawing instruction to cause the drawing device to draw the drawing stroke on an object, the drawing device being a device for drawing visual information on the object by transferring energy to the object.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
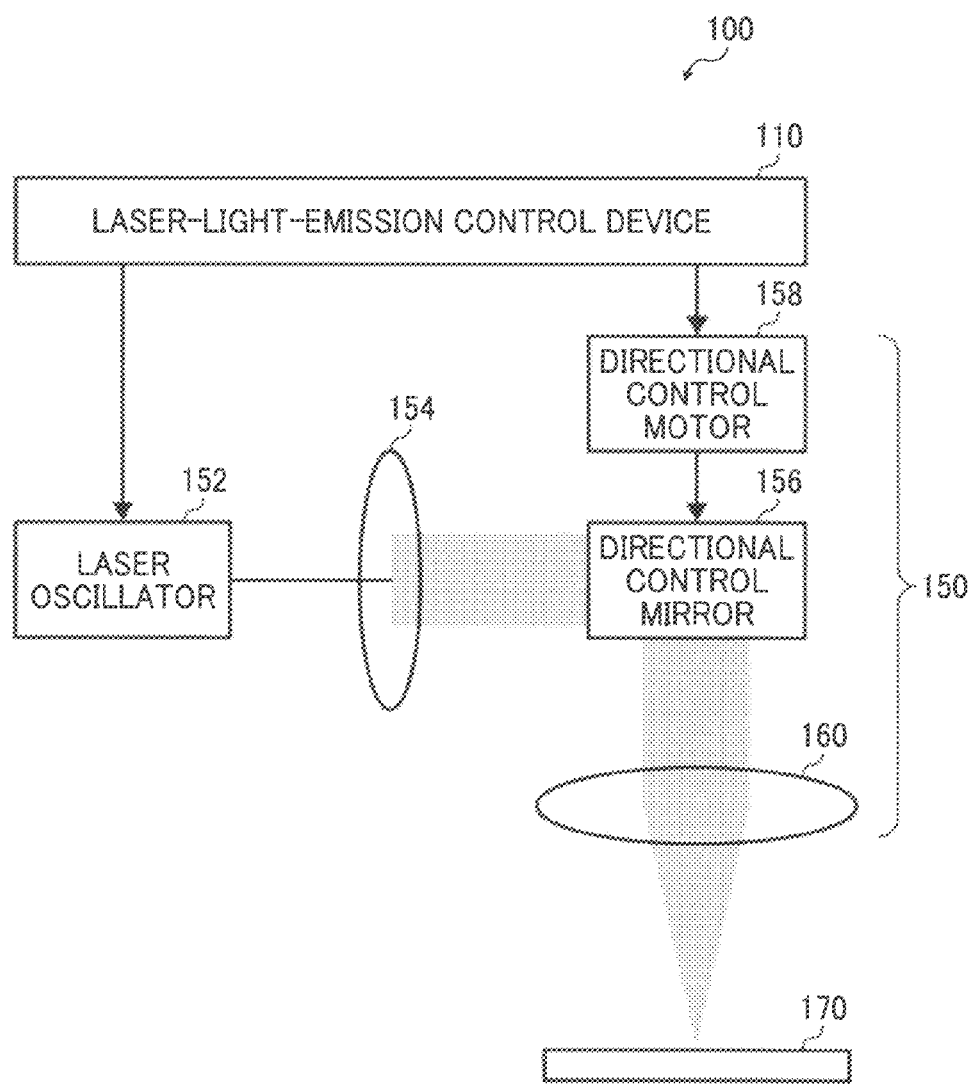
FIG. 1 is a diagram schematically illustrating an exemplary configuration of a laser-light emitting system according to a first embodiment of the present invention.

Exemplary embodiments of the present invention will be described in detail below with reference to the accompanying drawings.

First Embodiment

A first embodiment of the present invention will be described. In the first embodiment, at first, a drawing instruction for drawing each stroke in a drawing stroke is generated. The drawing stroke is a stroke of a brightness-inverted shape. Then the brightness-inverted shape is drawn on an object by irradiating the object with laser light according to the generated drawing instruction.

A configuration of a laser-light emitting system 100 according to the first embodiment will be described below.

FIG. 1 is a configuration diagram schematically illustrating a laser-light emitting system 100 according to the first embodiment. As illustrated in FIG. 1, the laser-light emitting system 100 includes a laser-light-emission control device 110 and a laser-light emitting device 150.

The laser-light-emission control device 110 (which is an example of a drawing control device) generates a drawing instruction for use in controlling the laser-light emitting device 150 (which is an example of a drawing device) and controls the laser-light emitting device 150 by using the generated drawing instruction. The laser-light-emission control device 110 will be described in detail later.

The laser-light emitting device 150 heats a thermal rewritable medium 170 (which is an example of an object) by emitting laser light onto the thermal rewritable medium 170 under control of the control laser-light-emission control device 110, to write a shape such as a character or a symbol, or a brightness-inverted shape on the thermal rewritable medium 170. The laser-light emitting device 150 includes a laser oscillator 152, an optical lens 154, a directional control mirror 156, a directional control motor 158, and a condensing lens 160.

The laser oscillator 152 is a device that oscillates laser light according to the drawing instruction generated by the laser-light-emission control device 110. Examples of the laser oscillator 152 include a semiconductor laser diode (LD), a gas laser, a solid-state laser, a liquid laser.

The optical lens 154 enlarges a spot diameter of the laser light oscillated by the laser oscillator 152. The laser light enters the directional control mirror 156 from the optical lens 154.

The directional control mirror 156 has a reflection surface (not shown), from which the laser light, whose spot diameter has been enlarged by the optical lens 154, is reflected to change an irradiation direction of the laser light.

The directional control motor 158 drives the directional control mirror 156 according to the drawing instruction generated by the laser-light-emission control device 110 to biaxially control orientation of the reflection surface on the directional control mirror 156, thereby adjusting an irradiation position of the laser light on the thermal rewritable medium 170. A servo motor or the like can be used as the directional control motor 158. In the laser-light emitting device 150, the directional control mirror 156 and the directional control motor 158 constitute a galvanometer mirror.

The condensing lens 160 causes the laser light from the directional control mirror 156 to converge on a surface of the thermal rewritable medium 170.

The thermal rewritable medium 170 is a heat-sensitive medium that develops color by being heated to a color developing temperature zone and then cooled rapidly and erases the color by heating the color-developing portion to a color-erasing temperature zone, which is lower than the color developing temperature zone. In this example, the thermal rewritable medium 170 is a heat-sensitive medium that turns from white to block when heated. More specifically, a shape is drawn on the thermal rewritable medium 170 as a solid shape of black line segments against a white background, while a brightness-inverted shape is drawn on the thermal rewritable medium 170 as a hollow shape of white line segments against a black background.

In the first embodiment, a thermal rewritable medium will be taken as an example of the object on which a shape, such as a character or a symbol, is to be written. However, the object is not limited to this example. For example, a non-rewritable medium, such as thermal paper, a plastic medium, or a metal medium, may be employed as the object. If a plastic medium or a metal medium is used as the object, when the object is irradiated with laser light, a shape, such as a character or a symbol, is engraved on the object, i.e., the shape portion is concave, while a brightness-inverted shape is formed on the object by engraving the surroundings of the shape, i.e., the shape portion is convex.

Normal thermal rewritable media and heat-sensitive paper do not absorb near-infrared laser light. Accordingly, if a laser-light emitting device (such as a semiconductor laser or a YAG laser as a solid-state laser) that emits near-infrared wavelength light is used as the laser oscillator 152, it is necessary to add a material or a layer, which absorbs the laser light, to the thermal rewritable medium or the thermal paper.

Figure 2:
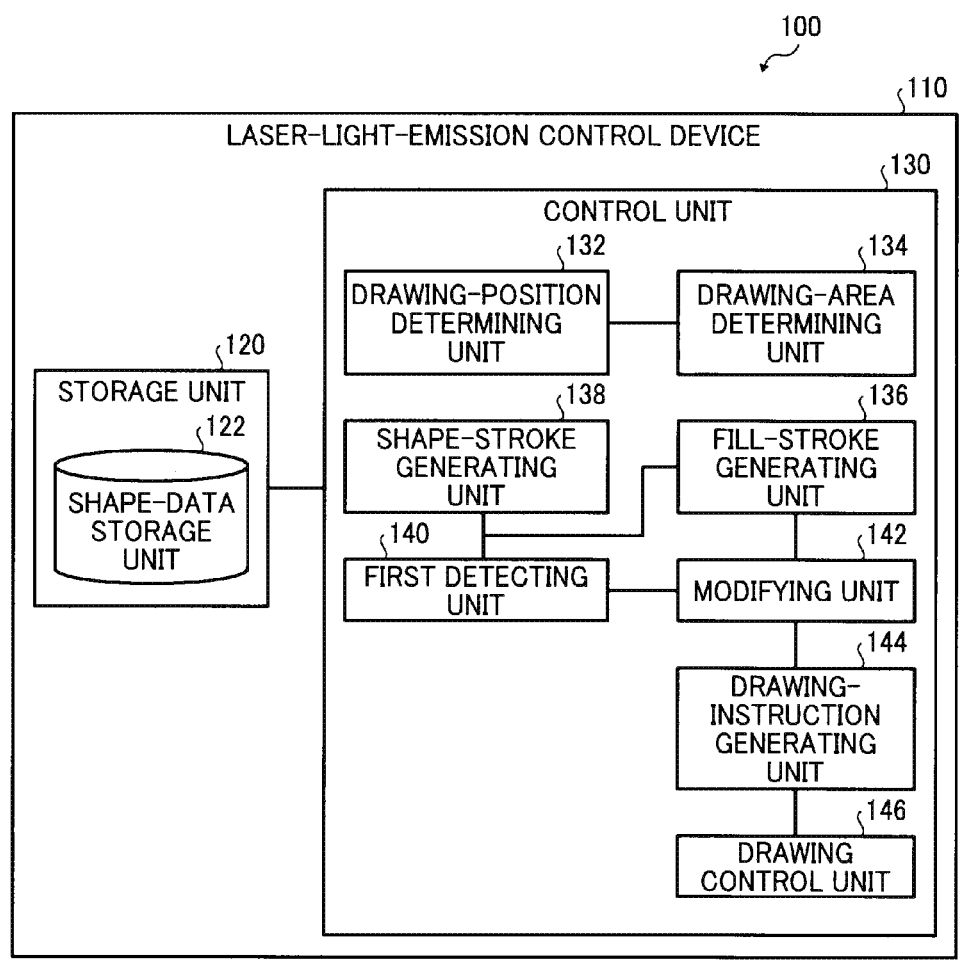
FIG. 2 is a block diagram illustrating an exemplary functional configuration of a laser-light-emission control device according to the first embodiment of the present invention.

FIG. 2 is a block diagram illustrating an exemplary functional configuration of the laser-light-emission control device 110 according to the first embodiment. As illustrated in FIG. 2, the laser-light-emission control device 110 includes a storage unit 120 and a control unit 130.

The storage unit 120 stores various program codes to be executed by the laser-light-emission control device 110 and data for use in various processing performed by the laser-light-emission control device 110. The storage unit 120 is realized by an existing storage device capable of magnetically, optically, or electrically storing data, such as a hard disk drive (HDD), a solid state drive (SSD), a memory card, an optical disk, read only memory (ROM), or random access memory (RAM). The storage unit 120 includes a shape-data storage unit 122.

The shape-data storage unit 122 stores shape data that indicates a shape to be drawn. For instance, the shape-data storage unit 122 stores stroke font data that defines a character, a symbol, or the like by alignment of center lines (more specifically, coordinate values of end points of the center lines). In this example, it is assumed that the stroke font data is defined by coordinate values of a standardized font size. The stroke font data may include order of drawing.

The control unit 130 performs various processing to control the laser-light emitting device 150. A central processing unit (CPU), an application specific integrated circuit (ASIC), or the like can be used as the control unit 130. The control unit 130 includes a drawing-position determining unit 132, a drawing-area determining unit 134, a fill-stroke generating unit 136, a shape-stroke generating unit 138, a first detecting unit 140, a modifying unit 142, a drawing-instruction generating unit 144, and a drawing control unit 146.

The drawing-position determining unit 132 determines a position where a shape is to be drawn (hereinafter, "drawing position"). More specifically, the drawing-position determining unit 132 determines a drawing position of a shape to be drawn, based on drawing-position determining data, such as a drawing base point, a shape to be drawn, and a size of the shape. The drawing-position determining data may be either stored in the storage unit 120 in advance or entered from an input unit (not shown). Alternatively, a part of the drawing-position determining data may be stored in the storage unit 120 in advance, and the rest of the drawing-position determining data may be entered from the input unit. Further alternatively, the drawing-position determining unit 132 may refer to the shape data stored in the shape-data storage unit 122 to determine the drawing position of the shape to be drawn.

Figure 3:
FIG. 3 is a diagram illustrating an example of drawing positions.

FIG. 3 is a diagram illustrating an example of drawing positions. In FIG. 3, each of the drawing positions of characters in a character string 201 to be drawn is indicated by a black frame. In the example illustrated in FIG. 3, the drawing-position determining unit 132 determines the drawing positions of the characters based on the character string 201 and its size with reference to a drawing base point (x0, y0).

More specifically, at first, the drawing-position determining unit 132 determines a drawing start position such that an upper-left corner of a first character on a first line (a character 202 in the example illustrated in FIG. 3) is the drawing base point (x0, y0). Thereafter, the drawing-position determining unit 132 determines a character width w, a clearance sh, which is a clearance to be left between characters, and a character height h of the first character (the character 202 in the example illustrated in FIG. 3). The character width w can be, for instance, the product of a character scaling factor r, which is specified by a user by using the input unit, and a font character width f, which is defined by a font size. In this case, the character width w can be expressed by the following equation: $w = f \times r$. The clearance sh between characters can be, for instance, specified by a user by using the input unit in advance. The character height h can be, for instance, the product of the scaling factor r and a font character height g, which is defined by the font size. In this case, the character height h can be expressed by the following equation: h=g×r. Hence, the drawing-position determining unit 132 sets a drawing end position of the first character (the character 202 in the example illustrated in FIG. 3) to (x0+w, y0+g×r) and a drawing start position (x1, y1) of the next character (a character 203 in the example illustrated in FIG. 3) to (x0+w+sh, y0). Thereafter, the drawing-position determining unit 132 repeats, based on the calculated drawing start position, determination of a drawing end position of the character and a drawing start position of a subsequent character, thereby determining drawing start positions and drawing end positions of all the characters in the same line.

Subsequently, the drawing-position determining unit 132 sets a drawing start position (x0', y0') of a first character in the next line (a character 204 in the example illustrated in FIG. 3) to (x0, y0+g×r). Thereafter, as in the first line, the drawing-position determining unit 132 repeats, based on the obtained drawing start position, determination of a drawing end position of the character and a drawing start position of a subsequent character, thereby determining drawing start positions and drawing end positions of all the characters in the same line.

Figure 4:
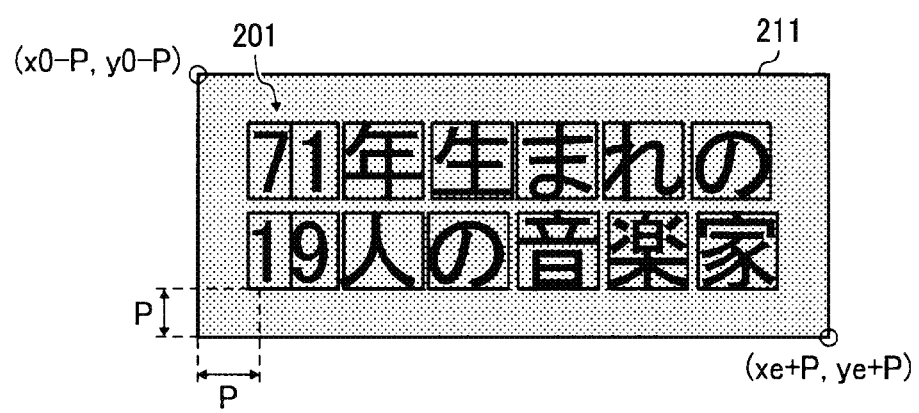
FIG. 4 is a diagram illustrating an example of a drawing area.

Referring back to FIG. 2, the drawing-area determining unit 134 determines a drawing area. FIG. 4 is a diagram illustrating an example of a drawing area. In the example illustrated in FIG. 4, the drawing-area determining unit 134 designates an area that surrounds all drawing positions determined by the drawing-position determining unit 132 as a drawing area 211.

More specifically, the drawing-area determining unit 134 obtains a minimum value of the drawing start positions of the characters determined by the drawing-position determining unit 132 and a maximum value of the drawing end positions of the same, and sets the minimum value and the maximum value to (x0, y0) and (xe, ye), respectively. A margin P to be left around the drawing positions may be specified in advance, for instance, by a user via the input unit. Note that the margin P should be equal to or wider than line width of a stroke because the laser-light emitting device 150 is not capable of appropriately representing an area with width that is smaller than the line width, which will be described later. Accordingly, the drawing-area determining unit 134 sets the drawing area (the drawing area 211 in the example illustrated in FIG. 4) to be an area (x0−P, y0−P) to (xe+P, ye+P).

Referring back to FIG. 2, the fill-stroke generating unit 136 generates a fill stroke that includes a plurality of strokes that fill the drawing area. More specifically, the fill-stroke generating unit 136 generates, as the fill stroke, fill stroke data that indicates start points and end points of all strokes belonging to the fill stroke. In this example, a start point and an end point of a stroke are a start point and an end point of a center line of the stroke.

Figures 5A, 5B:
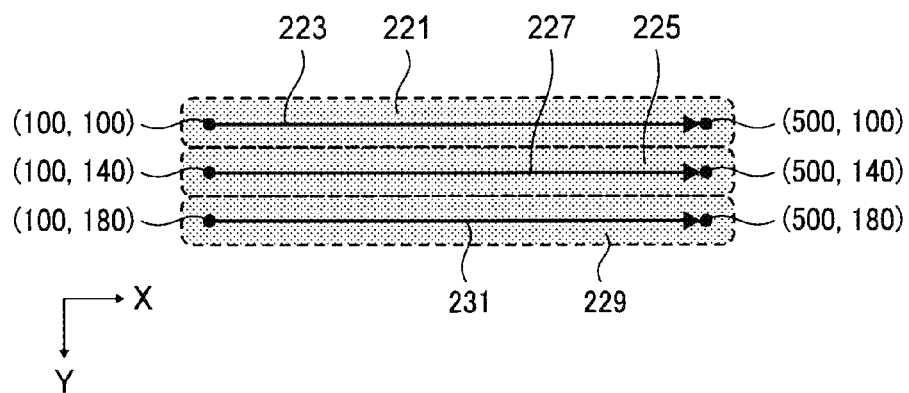
FIG. 5A is a diagram illustrating an example of a fill stroke.
FIG. 5B is a diagram illustrating an example of fill stroke data.

FIG. 5A is a diagram illustrating an example of the fill stroke. In the example illustrated in FIG. 5A, a stroke is defined as a line segment in an X direction. The fill-stroke generating unit 136 generates a fill stroke by sequentially shifting from one line segment to the next line segment by the amount of line width in a Y direction. The line width denotes width of the line segment. More specifically, the line width denotes width of a color developing area where color is developed on the thermal rewritable medium 170 when drawing a stroke on the thermal rewritable medium 170 by the laser-light emitting device 150. Accordingly, the shift amount from one line segment to the next line segment in the Y direction depends on the width of the color developing area. The width of the color developing area on the thermal rewritable medium 170 can be changed by adjusting a lens position or a focal length of at least one of the optical lens 154 and the condensing lens 160 and a distance from the thermal rewritable medium 170.

In the example illustrated in FIG. 5A, at first, the fill-stroke generating unit 136 generates a start point (100, 100) and an end point (500, 100) of a center line 223 of a line segment 221. Subsequently, the fill-stroke generating unit 136 generates a start point (100, 140) and an end point (500, 140) of a center line 227 of a line segment 225, and a start point (100, 180) and an end point (500, 180) of a center line 231 of a line segment 229, by sequentially shifting from one line segment to the next line segment in the Y-direction by 40 which is the size of the line width, thereby generating the fill stroke data illustrated in FIG. 5B.

As described above, in the first embodiment, the fill stroke is generated by sequentially shifting from one line segment in the X direction to the next line segment by the amount of line width in the Y-direction. Various methods for generating a fill stroke may be employed. For instance, a fill stroke can be generated by sequentially shifting from one line segment in the Y direction to the next line segment by the amount of line width in the X direction.

Referring back to FIG. 2, the shape-stroke generating unit 138 generates a shape stroke which is a stroke of a shape to be formed on the drawing area. More specifically, the shape-stroke generating unit 138 obtains shape data indicating a shape to be drawn, from the shape-data storage unit 122, and generates a shape stroke based on the shape data. For instance, the shape-stroke generating unit 138 obtains stroke font data of each of the characters in the character string 201 from the shape-data storage unit 122, and generates a shape stroke for each of the characters based on the obtained stroke font data. More specifically, the shape-stroke generating unit 138 generates, as the shape stroke, shape stroke data that indicates start points and end points of all strokes in the shape stroke. In this example, a start point and an end point of a stroke are a start point and an end point of a center line of the stroke. Note that a shape stroke may include a single stroke or a plurality of strokes.

The method for generating a shape stroke will be described below more specifically with reference to FIGS. 6A to 6E.

Figure 6A:
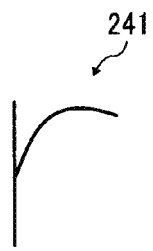
FIG. 6A is a diagram illustrating an example of stroke font data.

FIG. 6A is a diagram illustrating an example of stroke font data 241. The stroke font data 241 in the example illustrated in FIG. 6A has a curve portion. In the first embodiment, a stroke is defined as a line segment. Accordingly, the shape-stroke generating unit 138 approximates the curve portion in the stroke font data 241 by straight line segments. This approximation is performed because calculation of distances between line segments is complicated due to the presence of a curve portion. Stroke font data with a curve portion contains data for use in controlling the curve, which allows the shape-stroke generating unit 138 to determine whether the stroke font data has a curve portion according to the presence or absence of data for use in controlling a curve.

Figure 6B:
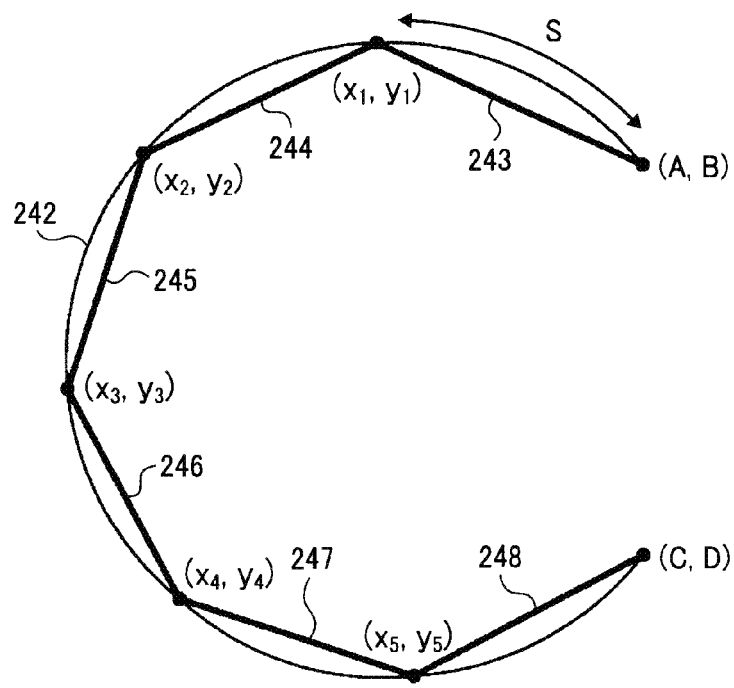
FIG. 6B is an explanatory diagram illustrating a straight-line approximation of a curve portion.

FIG. 6B is an explanatory diagram illustrating a method for approximating a curve portion by straight line segments. In the example illustrated in FIG. 6B, the shape-stroke generating unit 138 obtains coordinates of five points $(x_1, y_1)$ to $(x_5, y_5)$ on a curve portion 242 which extends from a start point (A, B) to an end point (C, D), by detecting coordinates on the curve portion 242 at distance intervals of a predetermined distance s. The shape-stroke generating unit 138 thus approximates the curve portion 242 by line segments 243 to 248.

Figure 6C:
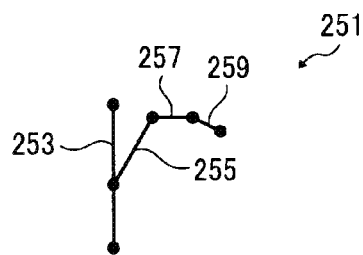
FIG. 6C is a diagram illustrating an example of the stroke font data approximated by straight line segments.

FIG. 6C is a diagram illustrating an example of stroke font data 251 which is obtained by approximating the stroke font data 241 by straight line segments. In the example illustrated in FIG. 6C, the stroke font data 251 includes a line segment 253 corresponding to a straight-line portion of the stroke font data 241 and line segments 255, 257, and 259 which are obtained by approximating the curve portion of the stroke font data 241 by straight line segments. The shape-stroke generating unit 138 changes magnification of the stroke font data 251 for adjustment to a desired drawing position and a font size, thereby obtaining a shape stroke.

Figures 6D, 6E:
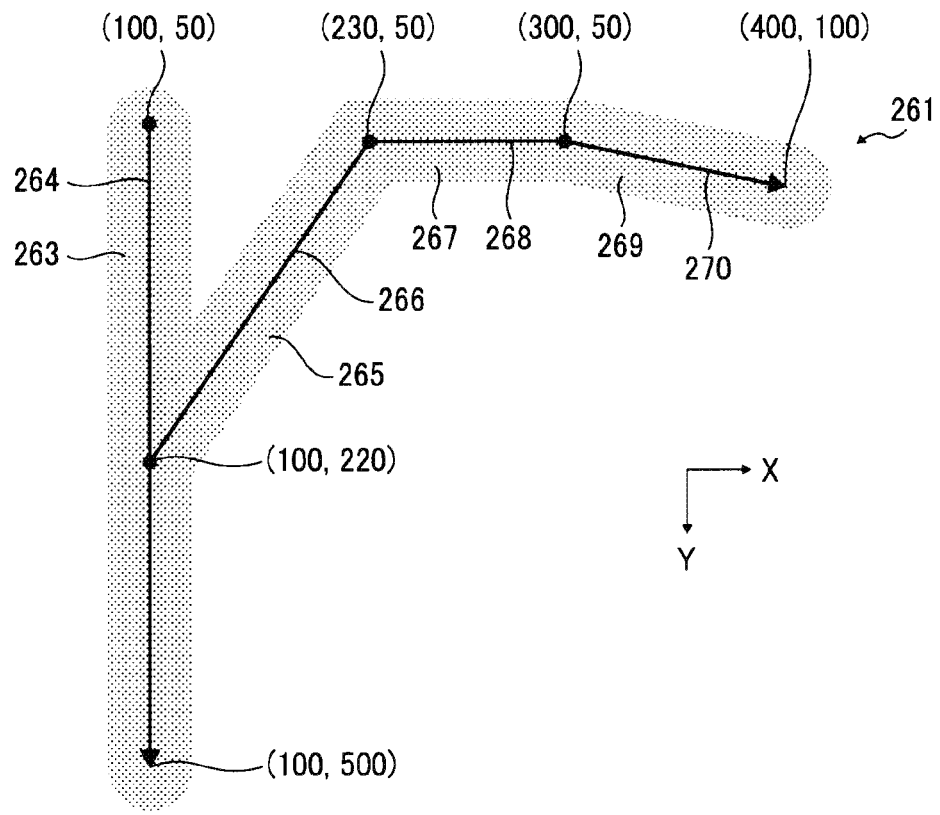
FIG. 6D is a diagram illustrating an example of a shape stroke.
FIG. 6E is a diagram illustrating an example of shape stroke data.

FIG. 6D is a diagram illustrating an example of a shape stroke 261 obtained by changing magnification of the stroke font data 251. In the example illustrated in FIG. 6D, the shape-stroke generating unit 138 changes the magnification of the stroke font data 251 to obtain the shape stroke 261, thereby obtaining a start point (100, 50) and an end point (100, 500) of a center line 264 of a line segment 263, which is obtained by changing the magnification of the line segment 253; a start point (100, 220) and an end point (230, 50) of a center line 266 of a line segment 265, which is obtained by changing the magnification of the line segment 255; a start point (230, 50) and an end point (300, 50) of a center line 268 of a line segment 267, which is obtained by changing the magnification of the line segment 257; and a start point (300, 50) and an end point (400, 100) of a center line 270 of a line segment 269, which is obtained by changing the magnification of the line segment 259. The shape-stroke generating unit 138 thus generates shape stroke data illustrated in FIG. 6E.

In the first embodiment, a shape stroke is generated by approximating stroke font data by straight line segments and thereafter changing the magnification. Various methods can be employed to generate a shape stroke. For instance, a shape stroke can be generated by changing magnification of stroke font data and thereafter performing an approximation by straight line segments, or only by performing an approximation by straight line segments.

Referring back to FIG. 2, the first detecting unit 140 detects an overlap portion where a fill stroke and a shape stroke overlap with each other. More specifically, the first detecting unit 140 detects a portion where a distance between a center line of one of strokes described in the fill stroke data and a center line of one of strokes described in the shape stroke data is equal to or smaller than the line width (the width of a color developing area), as an overlap portion.

Reference will now be made in detail to how to detect an overlap portion by the first detecting unit 140. The first detecting unit 140 detects line segments which may overlap with each other due to their position and width, based on fill stroke data and shape stroke data. For instance, the first detecting unit 140 determines whether the overlap occurs, based on coordinates of a fill stroke described in the fill stroke data of FIG. 5B and coordinates of a shape stroke described in the shape stroke data of FIG. 6E.

More specifically, the first detecting unit 140 calculates a distance between line segments based on coordinates of the line segments according to the following rule:

If the line segments intersect with each other, the distance between the line segments is zero; and If the line segments do not intersect with each other, the distance therebetween is either a length of a perpendicular line (if a perpendicular line can be set) dropped from an end of one of the line segments to the other line segment, or distances between ends of one of the line segments and ends of the other line segment.

The first detecting unit 140 expresses each of the two line segments by a linear equation and solves the simultaneous equations. The first detecting unit 140 determines that, when an intersection point is on the line segments, the line segments intersect with each other and therefore the distance therebetween is zero. For instance, assuming that the two line segments are given by Equations (1) and (2) and a coordinate of an intersection point between the line segments is given by (xp, yp), the intersection point is given by Equation (3):

$$y = a1x + b1 \tag{1}$$

$$y = a2x + b2 \tag{2}$$

$$(xp, yp) = ((b2-b1)/(a1-a2), a1xp+b1) \tag{3}$$

Subsequently, if the line segments do not intersect with each other, the first detecting unit 140 drops a perpendicular line from one end of one of the line segments to the other line segment, and calculates an intersection point between the perpendicular line and the other line segment. If the intersection point is on the other line segment, the first detecting unit 140 calculates the length of the perpendicular line (distance from the one end of the one line segment to the intersection point on the other line segment). For instance, the perpendicular line is given by Equation (4):

$$y = cx + d \tag{4}$$

Moreover, if the line segments do not intersect with each other, the first detecting unit 140 calculates four distances between ends of one of the line segments and ends of the other line segment. Alternatively, the first detecting unit 140 may calculate the four distances only when the length of a perpendicular line dropped from one line segment to the other line segment cannot be obtained.

Figure 7A:
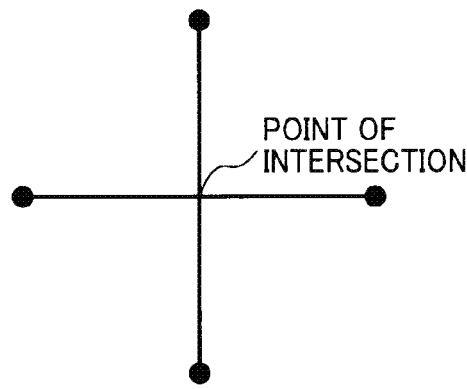
FIG. 7A is a diagram illustrating an example of two line segments that intersect with each other.
Figure 7B:
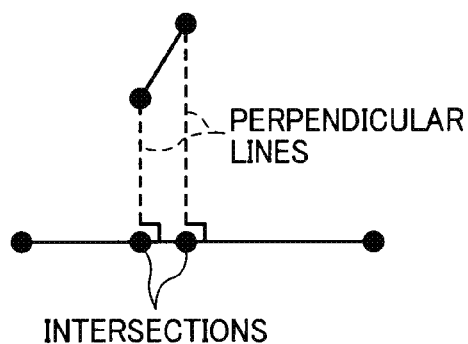
FIG. 7B is a diagram illustrating an example of two line segments that do not intersect with each other but perpendicular lines can be set between the two line segments.
Figure 7C:
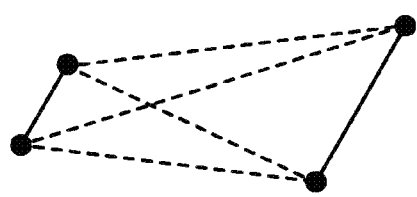
FIG. 7C is a diagram illustrating an example of two line segments that do not intersect with each other and perpendicular lines cannot be set between the two line segments.

FIG. 7A is a diagram illustrating an example of two line segments that intersect with each other. FIG. 7B is a diagram illustrating an example of two line segments that do not intersect with each other but a perpendicular line can be dropped from one line segment to the other. FIG. 7C is a diagram illustrating an example of two line segments that do not intersect with each other and a perpendicular line cannot be dropped from one line segment to the other. In the example illustrated in FIG. 7A, the first detecting unit 140 determines that the line segments intersect with each other and therefore the distance is zero because an intersection point is on the line segments according to a solution of Equation (3). In the example illustrated in FIG. 7B, the first detecting unit 140 determines that the line segments do not intersect with each other because an intersection point is not on the line segments according to a solution of Equation (3). Accordingly, the first detecting unit 140 drops a perpendicular line from an end of one of the line segments to the other line segment and calculates the length of the perpendicular line because the perpendicular line intersects with the other line segment. The first detecting unit 140 also calculates distances between ends of one of the line segments and ends of the other line segment. In the example illustrated in FIG. 7C, the two line segments are parallel to each other. Accordingly, the first detecting unit 140 determines that the line segments cannot intersect with each other because an intersection point is not obtained from Equation (3). In this case, although the first detecting unit 140 drops a perpendicular line from an end of one of the line segments to the other line segment, an intersection point between the perpendicular line and the other line segment is not on the other line segment. The first detecting unit 140 therefore calculates distances between ends of one of the line segments and ends of the other line segment.

The first detecting unit 140 detects a portion where the obtained distance is equal to or smaller than the line width (the width of the color developing area) as an overlap portion, and extracts a pair of line segments in the overlap portion. The first detecting unit 140 detects (line width (width of a color developing area))−(distance) as an overlapping amount.

The modifying unit 142 removes the overlap portion from the fill stroke to modify the fill stroke to obtain a drawing stroke. More specifically, the modifying unit 142 removes data pertaining to the overlap portion from fill stroke data, thereby modifying the fill stroke data to drawing stroke data.

Figure 8A:
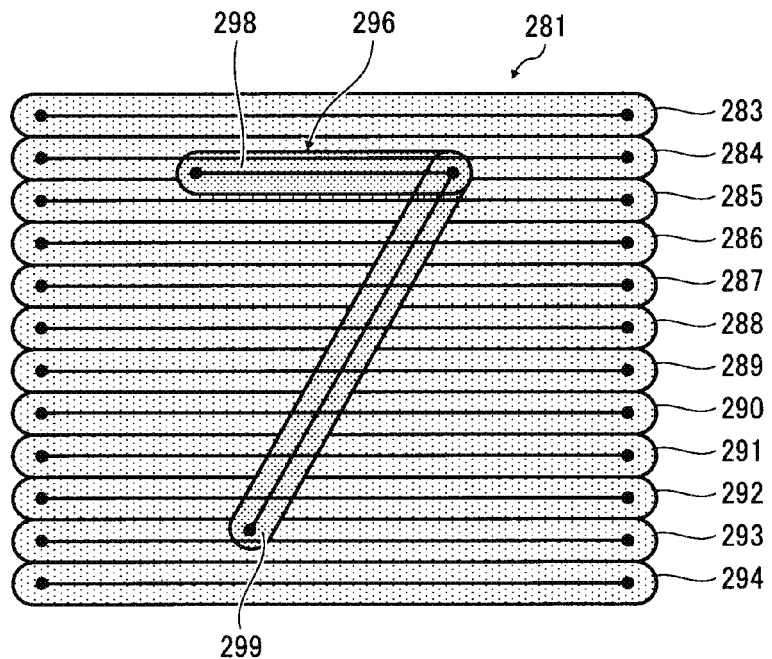
FIG. 8A is a diagram illustrating a fill stroke and a shape stroke that are arranged in a drawing area in an overlapping manner.
Figure 8B:
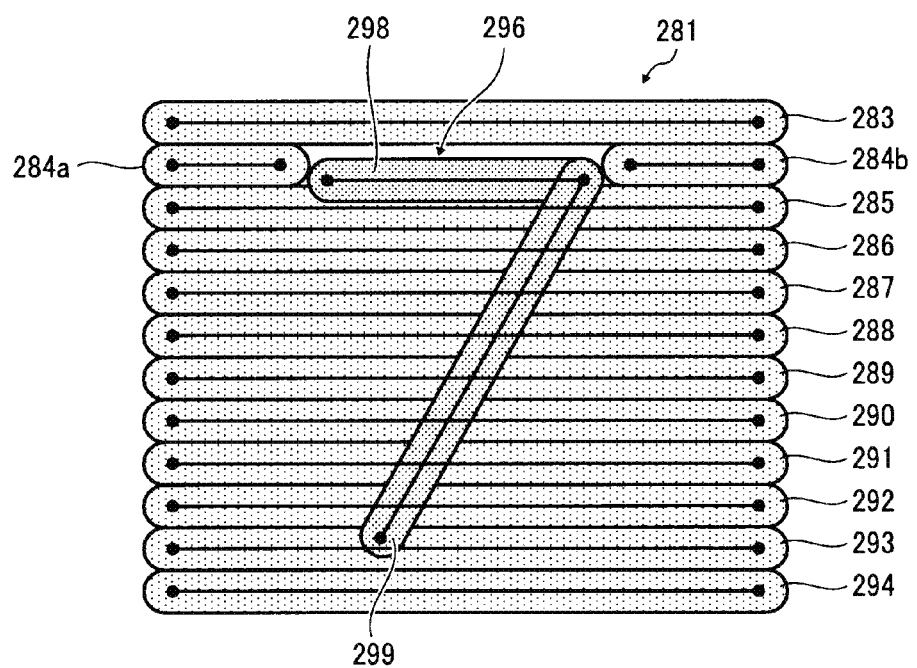
FIG. 8B is a diagram illustrating a modification process of the fill stroke.
Figure 8C:
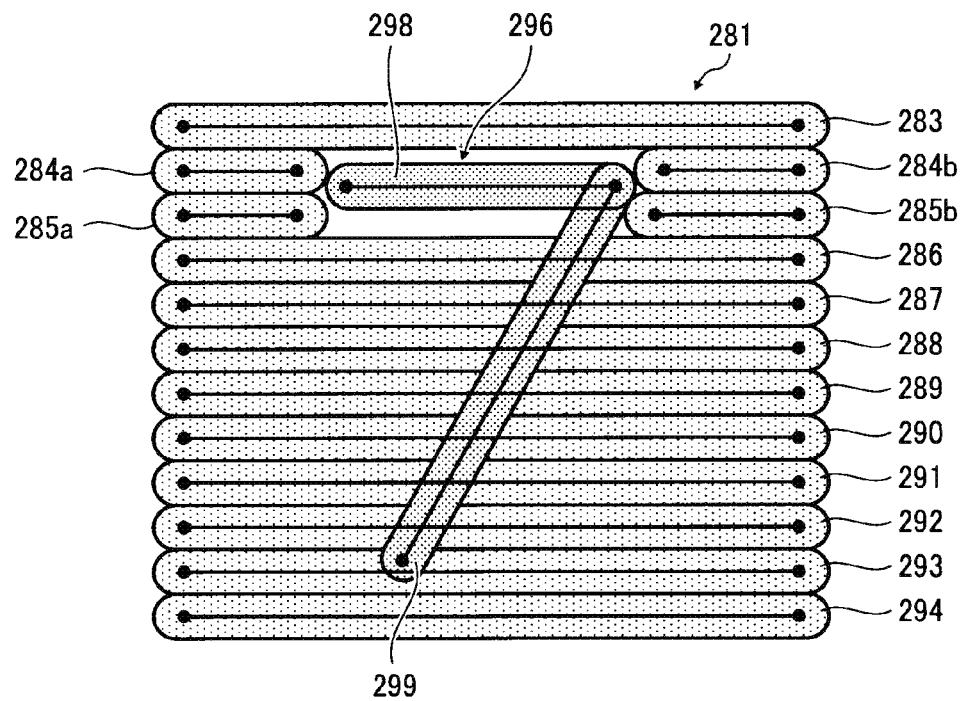
FIG. 8C is a diagram illustrating a modification process of the fill stroke.

FIG. 8A is a diagram illustrating a fill stroke and a shape stroke that are arranged in a drawing area in an overlapping manner. In the example illustrated in FIG. 8A, the first detecting unit 140 detects an overlap portion where a stroke 298 belonging to a shape stroke 296 overlaps with strokes 283 to 294 that belong to a fill stroke 281 on a stroke-by-stroke basis in the order of reference numerals of the strokes. In this example, at first, the first detecting unit 140 detects an overlap portion where the stroke 298 overlaps with the stroke 284. Therefore, the modifying unit 142 removes the overlap portion from the stroke 284 to modify the stroke 284 to a stroke 284a and a stroke 284b, and determines coordinates of the strokes 284a and 284b. Hence, the fill stroke 281 has been modified as illustrated in FIG. 8B. Subsequently, the first detecting unit 140 detects an overlap portion where the stroke 298 overlaps with the stroke 285. Therefore, the modifying unit 142 removes the overlap portion from the stroke 285, thereby modifying the stroke 285 to a stroke 285a and a stroke 285b, and determines coordinates of the strokes 285a and 285b. Hence, the fill stroke 281 is modified as illustrated in FIG. 8C.

Figure 8D:
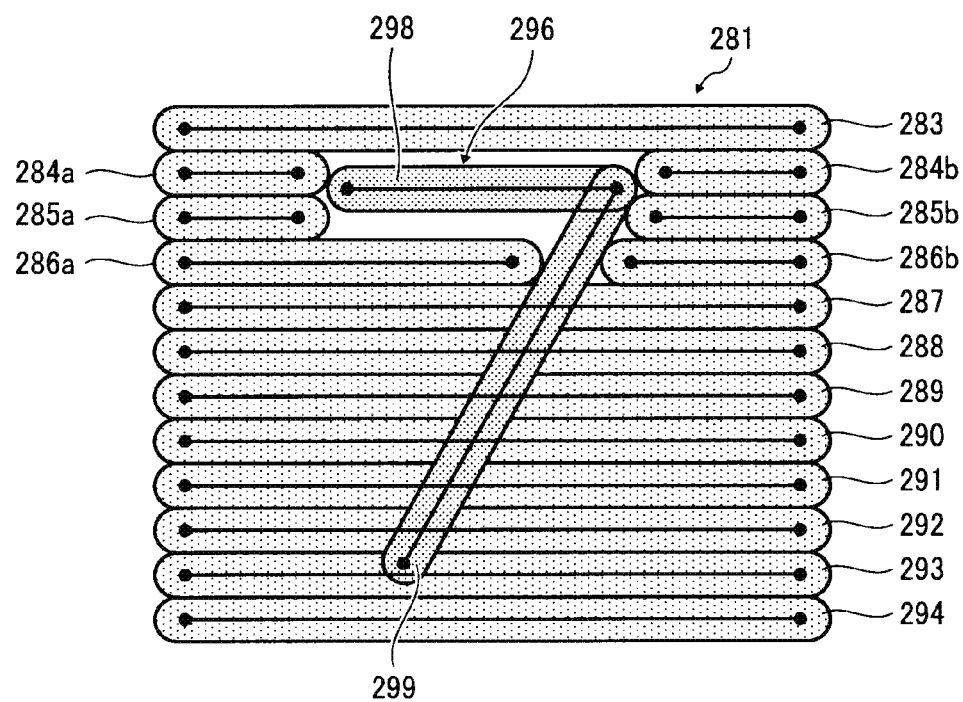
FIG. 8D is a diagram illustrating a modification process of the fill stroke.

Upon completion of the overlap detection for the stroke 298 and the strokes 283 to 294, the first detecting unit 140 detects an overlap portion where a stroke 299 belonging to the shape stroke 296 overlaps with the strokes 283 to 294 on a stroke-by-stroke basis in the order of reference numerals of the strokes. In this example, at first, the first detecting unit 140 detects an overlap portion where the stroke 299 overlaps with the stroke 286. Therefore, the modifying unit 142 removes the overlap portion from the stroke 286, thereby modifying the stroke 286 to a stroke 286a and a stroke 286b, and determines coordinates of the strokes 286a and 286b. Hence, the fill stroke 281 has been modified as illustrated in FIG. 8D. Subsequently, detection and removal of an overlap portion are repeatedly performed by the first detecting unit 140 and the modifying unit 142, thereby modifying the stroke 287 to obtain a stroke 287a and a stroke 287b; modifying the stroke 288 to obtain a stroke 288a and a stroke 288b; modifying the stroke 289 to obtain a stroke 289a and a stroke 289b; modifying the stroke 290 to obtain a stroke 290a and a stroke 290b; modifying the stroke 291 to obtain a stroke 291a and a stroke 291b; modifying the stroke 292 to obtain a stroke 292a and a stroke 292b; and modifying the stroke 293 to obtain a stroke 293a and a stroke 293b. Eventually, the fill stroke 281 is modified as illustrated in FIG. 8E.

Figure 8E:
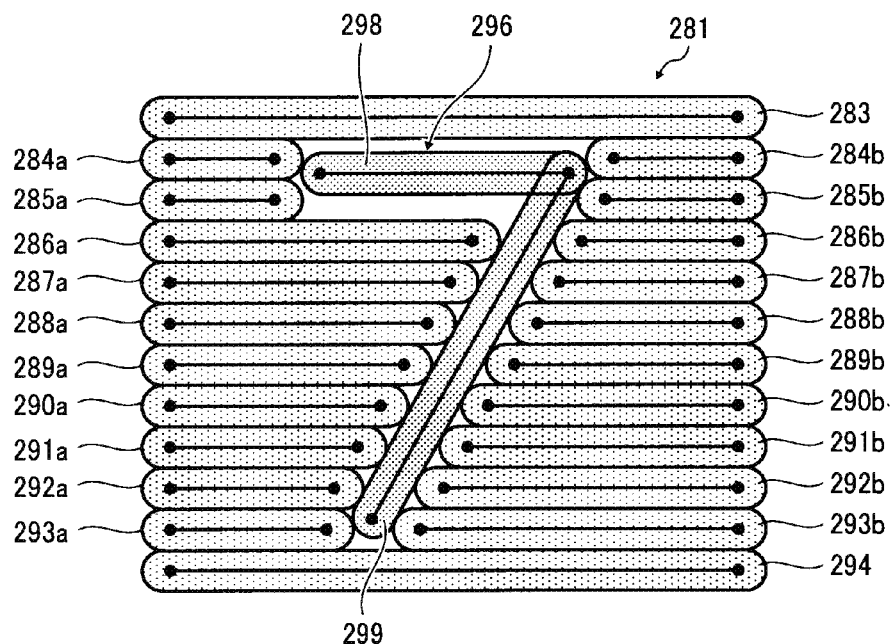
FIG. 8E is a diagram illustrating a modification process of the fill stroke.
Figure 8F:
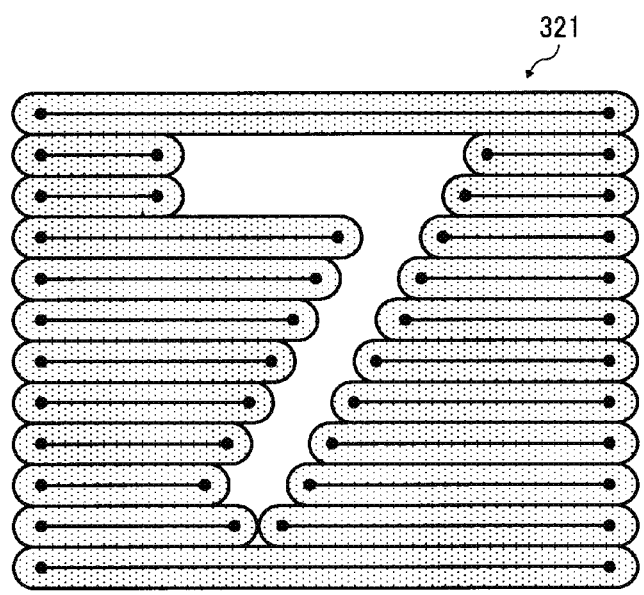
FIG. 8F is a diagram illustrating an example of a drawing stroke.

The modifying unit 142 removes the shape stroke 296 from the modified fill stroke 281 illustrated in FIG. 8E, thereby obtaining a drawing stroke 321 as illustrated in FIG. 8F.

Referring back to FIG. 2, the drawing-instruction generating unit 144 generates a drawing instruction for drawing each stroke in a drawing stroke. More specifically, the drawing-instruction generating unit 144 generates the drawing instruction by converting drawing stroke data into a format that can be interpreted by the laser-light emitting device 150. For instance, the drawing-instruction generating unit 144 generates the drawing instruction by adding drawing-standby time for each stroke and line width (line thickness) of each stroke, to the drawing stroke data.

Figures 9A, 9B:
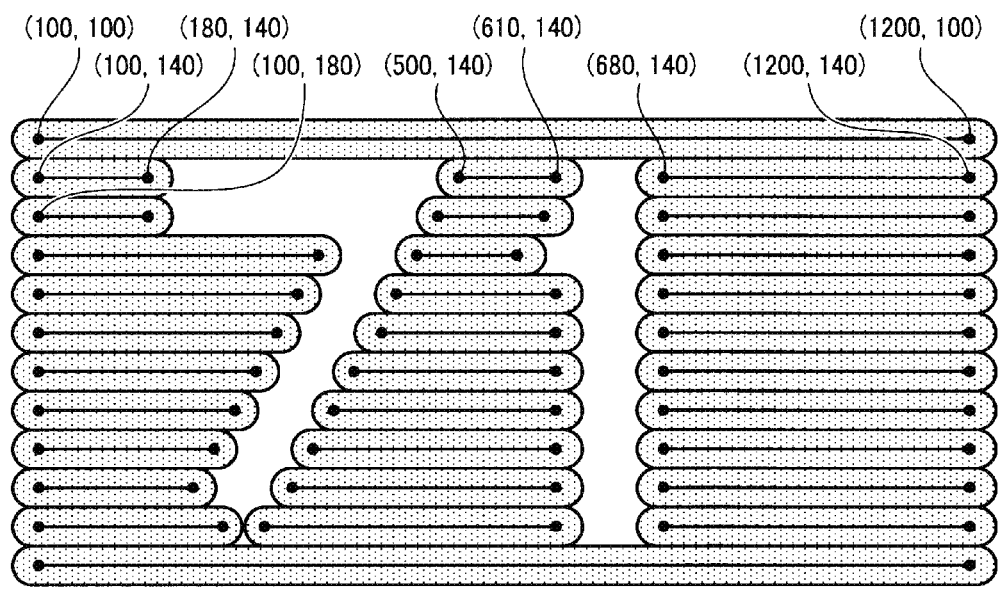
FIG. 9A is a diagram illustrating an example of a drawing stroke.
FIG. 9B is a diagram illustrating an example of a drawing instruction.

FIG. 9A is a diagram illustrating an example of a drawing stroke. FIG. 9B is a diagram illustrating a drawing instruction for drawing the drawing stroke illustrated in FIG. 9A. The drawing instruction illustrated in FIG. 9B contains instruction codes and parameters. An instruction code "t" is an instruction for setting line width of the drawing stroke to a value specified by a parameter. An instruction code "m" is an instruction for moving an irradiation position of laser light to a coordinate position specified by a parameter. An instruction code "d" is an instruction for emitting laser light until an irradiation position reaches a coordinate position specified by a parameter, thereby drawing a stroke. An instruction code "w" is an instruction for standing by for a period of time specified by a parameter.

Referring back to FIG. 2, the drawing control unit 146 controls the laser-light emitting device 150 by using the drawing instruction to cause the laser-light emitting device 150 to draw the drawing stroke on the thermal rewritable medium 170.

Figure 10:
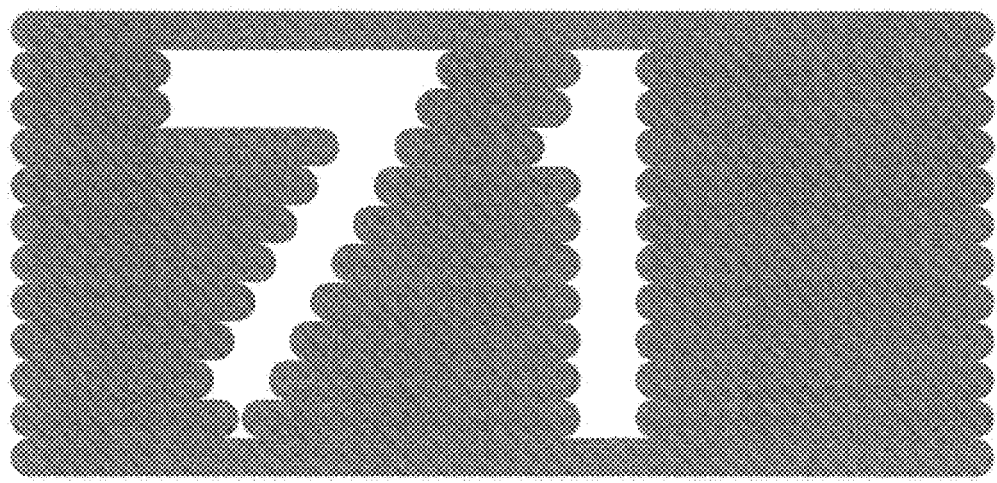
FIG. 10 is a diagram illustrating a hollow character string to be drawn on a thermal rewritable medium.

For instance, when the drawing control unit 146 controls the laser-light emitting device 150 to draw the drawing stroke shown in FIG. 9A on the thermal rewritable medium 170 using the drawing instruction shown in FIG. 9B, the laser-light emitting device 150 sets line width of a stroke to 40. Subsequently, the laser-light emitting device 150 moves the irradiation position of laser light to a point (100, 100) and draws a stroke from the point (100, 100) to a point (1200, 100). Subsequently, the laser-light emitting device 150 moves the irradiation position of laser light to a point (100, 140) and, after standing by for a period of time corresponding to "50," draws a stroke from the point (100, 140) to a point (180, 140). Subsequently, the laser-light emitting device 150 moves the irradiation position of laser light to a point (500, 140) and draws a stroke from the point (500, 140) to a point (610, 140). Subsequently, the laser-light emitting device 150 moves the irradiation position of laser light to a point (680, 140) and draws a stroke from the point (680, 140) to a point (1200, 140). Thereafter, the laser-light emitting device 150 continues to perform operations according to the drawing instruction, whereby the hollow character string illustrated in FIG. 10 is drawn (formed) on the thermal rewritable medium 170.

Next, reference will be made to an operation of the laser-light emitting system according to the first embodiment.

Figure 11:
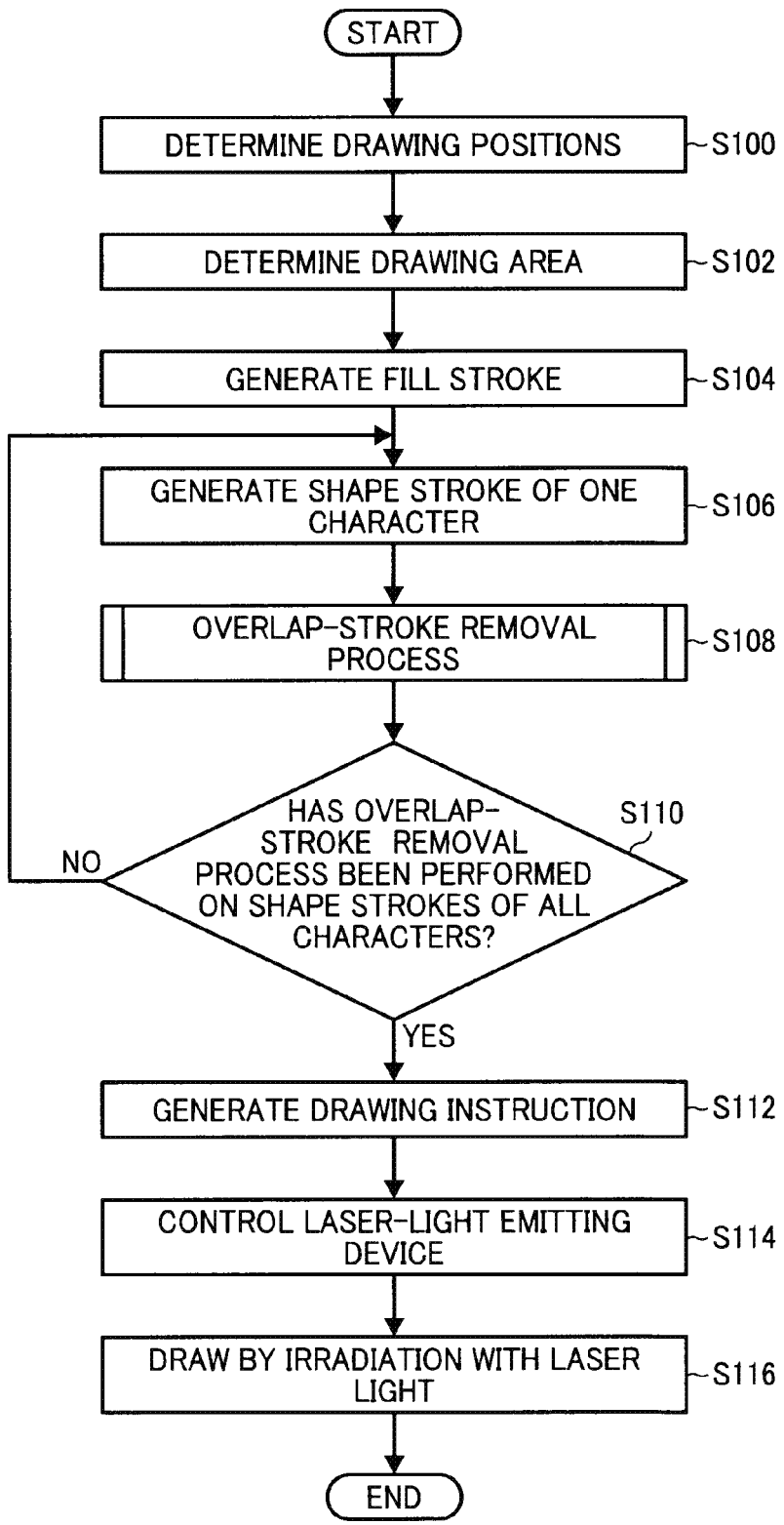
FIG. 11 is a flowchart of an exemplary process which is performed by the laser-light emitting system according to the first embodiment.

FIG. 11 is a flowchart of an exemplary process which is performed by the laser-light emitting system 100 according to the first embodiment. Here, a character string is taken as an example of a shape to be drawn.

The drawing-position determining unit 132 determines drawing positions of characters in the character string to be drawn, which corresponds to a shape to be drawn (Step S100).

Subsequently, the drawing-area determining unit 134 designates an area that surrounds all the drawing positions determined by the drawing-position determining unit 132, as a drawing area (Step S102).

Subsequently, the fill-stroke generating unit 136 generates a fill stroke that fills the drawing area determined by the drawing-area determining unit 134 (Step S104).

Subsequently, the shape-stroke generating unit 138 obtains stroke font data pertaining to one character in the character string to be drawn from the shape-data storage unit 122 and generates a shape stroke of the one character based on the obtained stroke font data (Step S106).

Subsequently, the first detecting unit 140 and the modifying unit 142 perform an overlap-stroke removal process, which is detection and removal of an overlap portion where the fill stroke generated by the fill-stroke generating unit 136 overlaps with the shape stroke of the one character generated by the shape-stroke generating unit 138 (Step S108). The overlap-stroke removal will be described in detail later.

Step S106 to Step S110 are repeated until the overlap-stroke removal processes for shape strokes of all the characters in the character string are completed (NO at Step S110).

Upon completion of the overlap-stroke removal processes for the shape strokes of all the characters in the character string (YES at Step S110), a drawing stroke is generated. The drawing stroke is obtained by removing overlap portions where the shape strokes in the character string overlap with the fill stroke, from the fill stroke. The drawing-instruction generating unit 144 generates a drawing instruction for drawing each stroke belonging to the generated drawing stroke (Step S112).

Subsequently, the drawing control unit 146 controls the laser-light emitting device 150 by using the drawing instruction generated by the drawing-instruction generating unit 144 (Step S114).

Subsequently, the laser-light emitting device 150 emits laser light onto the thermal rewritable medium 170 under control of the laser-light-emission control device 110, thereby drawing the drawing stroke on the thermal rewritable medium 170 (Step S116).

Figure 12:
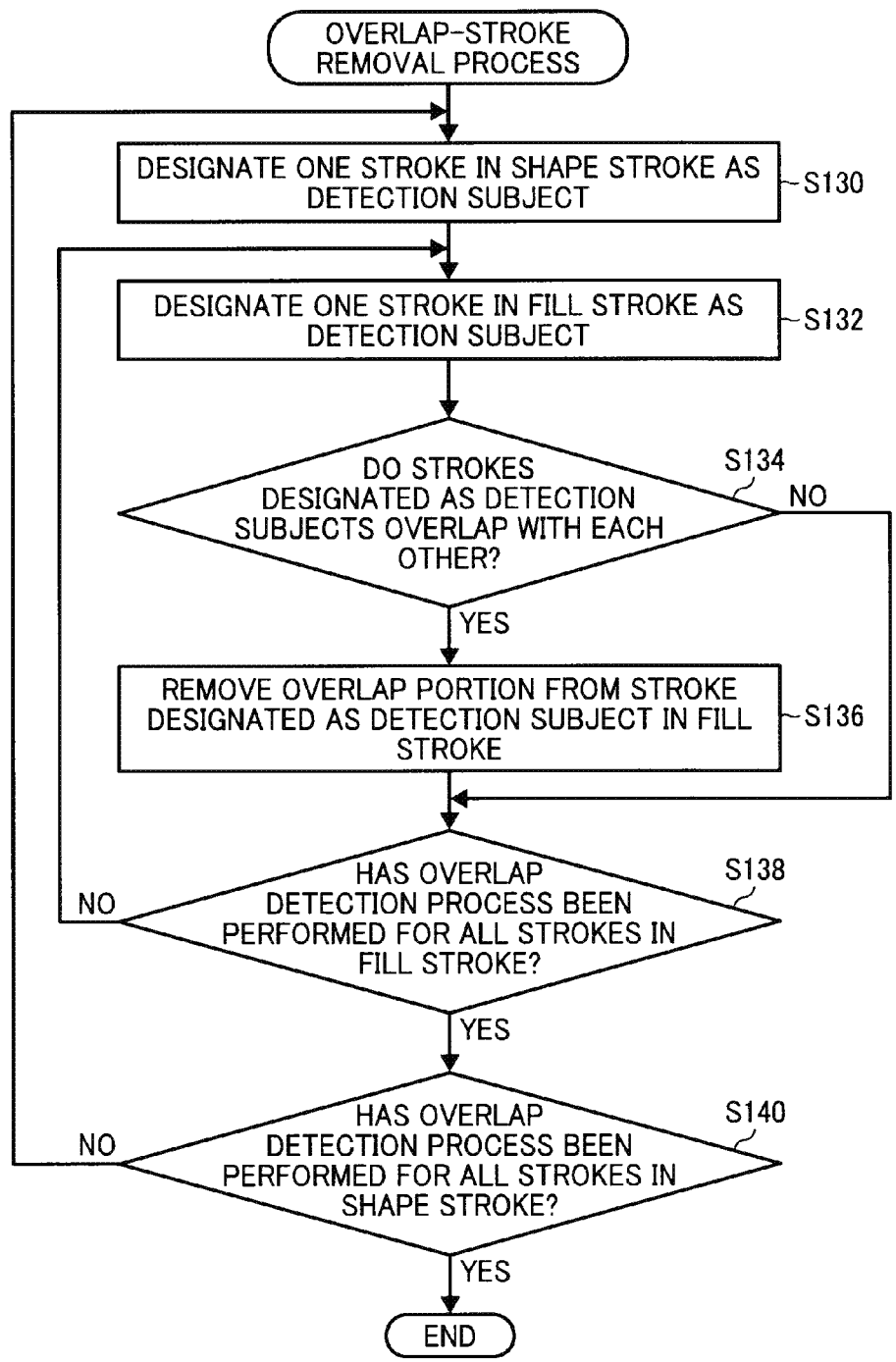
FIG. 12 is a flowchart of an exemplary process for overlap-stroke removal which is performed by the laser-light emitting system according to the first embodiment.

FIG. 12 is a flowchart illustrating an example of the overlap-stroke removal process at Step S108 in the flowchart illustrated in FIG. 11.

At first, the first detecting unit 140 designates one stroke belonging to the shape stroke as a detection subject (Step S130).

Subsequently, the first detecting unit 140 designates one stroke belonging to the fill stroke as a detection subject (Step S132).

Subsequently, the first detecting unit 140 determines whether the both strokes designated as the detection subjects overlap with each other (Step S134).

If an overlap portion between the both strokes is detected by the first detecting unit 140 (YES at Step S134), the modifying unit 142 removes the overlap portion from the stroke designated as the detection subject in the fill stroke (Step S136). If there is no overlap portion between the both strokes (NO at Step S134), the modifying unit 142 does not perform the process of Step S136.

Step S132 to Step S138 are repeated until the overlap detection processes for the stroke designated as the detection subject in the shape stroke and all the strokes in the fill stroke are completed (NO at Step S138).

Upon completion of the overlap detection processes for the stroke designated as the detection subject in the shape stroke and all the strokes in the fill stroke (YES at Step S138), Step S130 to Step S140 are repeated for all the other strokes in the shape stroke (NO at Step S140).

Upon completion of the overlap detection processes for all the strokes in the shape stroke (YES at Step S140), the overlap-stroke removal process performed by the first detecting unit 140 and the modifying unit 142 ends.

As described above, in the first embodiment, the laser-light-emission control device 110 generates a drawing instruction for direct interpretation of a drawing stroke as vector data, and causes a brightness-inverted shape to be drawn by using the drawing instruction. Thus, according to the first embodiment, a drawing instruction can be generated without converting a drawing stroke into raster data. This allows a brightness-inverted shape to be drawn with reduced drawing time. This also advantageously allows reduction of storage capacity of a storage device, such as memory, because there is no need to generate raster data which is relatively large in data size.

Second Embodiment

The first embodiment does not refer to irradiation intensity (power) of laser light in drawing a drawing stroke. However, if a stroke is not in contact with another stroke, heat loss to the surrounding environment tends to occur. This may cause color to be developed insufficiently at a boundary of a brightness-inverted shape, making the shape to appear blurred. In view of the circumstances, in a second embodiment of the present invention, a drawing stroke is drawn such that irradiation intensity (power) of laser light is set to be relatively high at a noncontact portion that is not in contact with other stroke. Difference between the second embodiment and the first embodiment will be primarily described below. The same reference numerals and the same name will be given without adding explanations for those configurations that are the same as the first embodiment.

Figure 13:
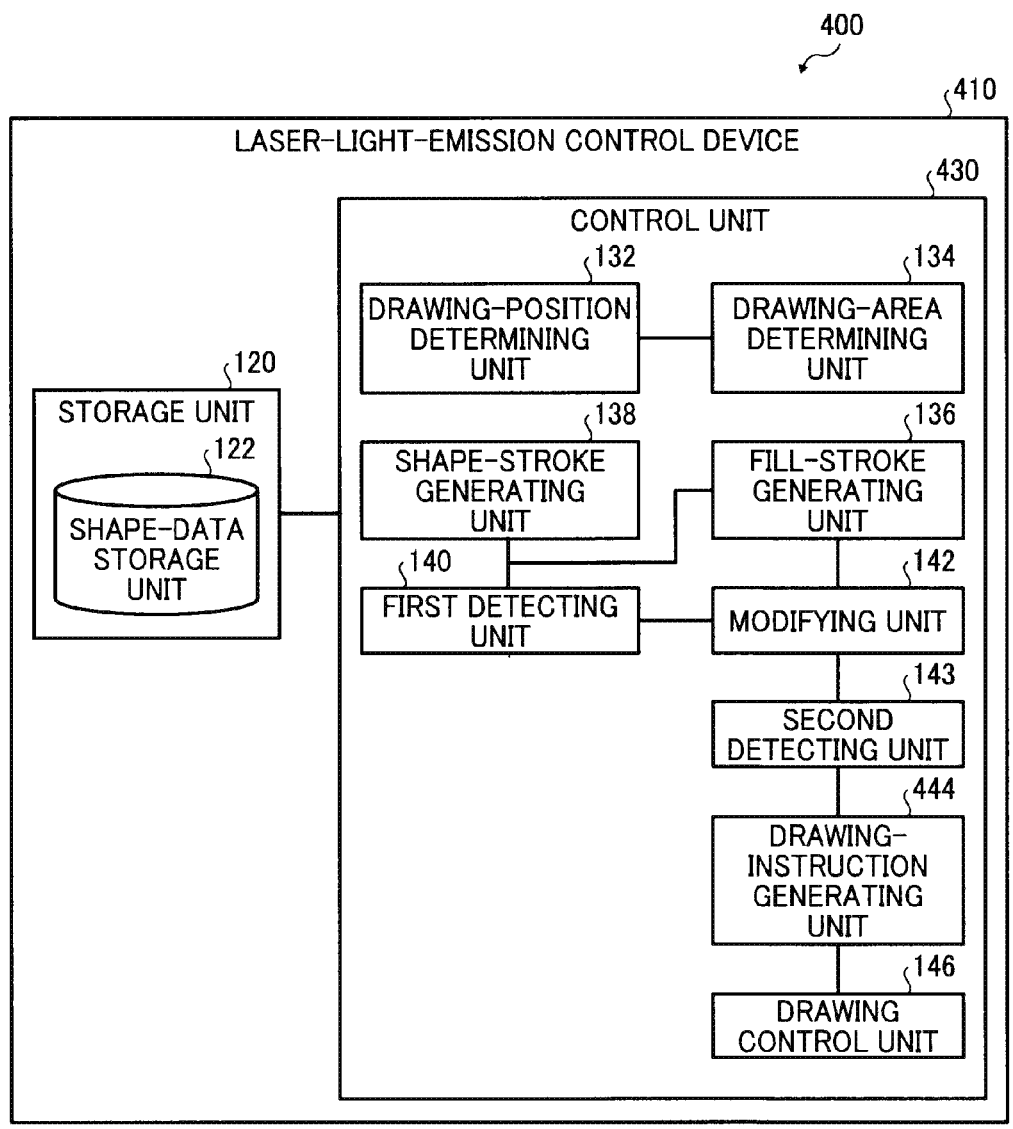
FIG. 13 is a block diagram illustrating an exemplary functional configuration of a laser-light-emission control device according to a second embodiment of the present invention.

FIG. 13 is a block diagram illustrating an exemplary functional configuration of a laser-light-emission control device 410 according to the second embodiment. The laser-light-emission control device 410 in a laser-light emitting system 400 of the second embodiment differs from the laser-light-emission control device 110 of the first embodiment in that a control unit 430 additionally includes a second detecting unit 443. In addition, a process which is performed by a drawing-instruction generating unit 444 differs from that of the drawing-instruction generating unit 144. These functional units will be described below.

Figure 14:
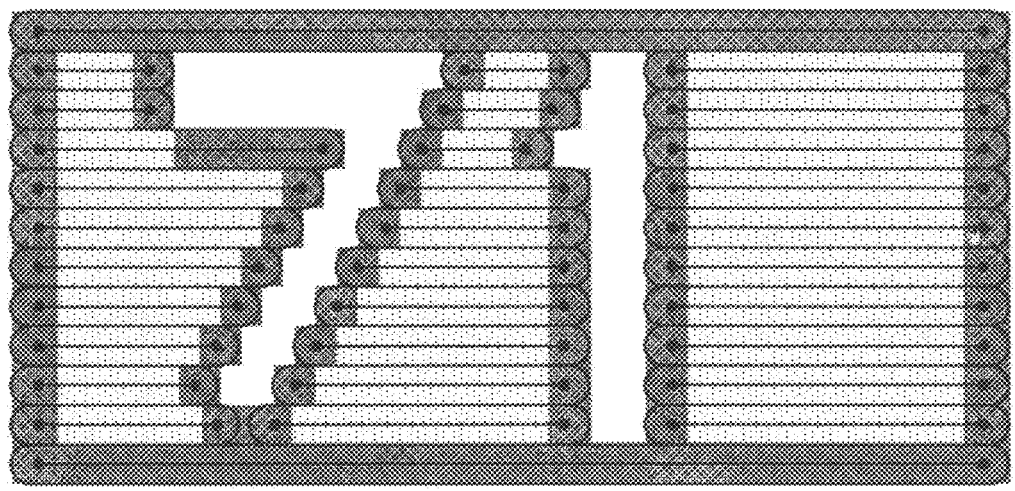
FIG. 14 is a diagram illustrating an example of a drawing stroke where noncontact portions have been detected.

The second detecting unit 443 detects, for each stroke belonging to a drawing stroke, a noncontact portion that is a portion out of contact with another stroke belonging to the drawing stroke. More specifically, the second detecting unit 443 detects, for each stroke described in drawing stroke data, a noncontact portion where, within a distance of the line width of the stroke from a center line of the stroke, there is no center line of another stroke described in the drawing stroke data. FIG. 14 is a diagram illustrating an example of a drawing stroke where noncontact portions have been detected. In the example illustrated in FIG. 14, boundary portions of the drawing stroke have been detected as the noncontact portions by the second detecting unit 443.

A method for detecting a noncontact portion will be described below more specifically with reference to FIGS. 15A and 15B.

Figure 15A:
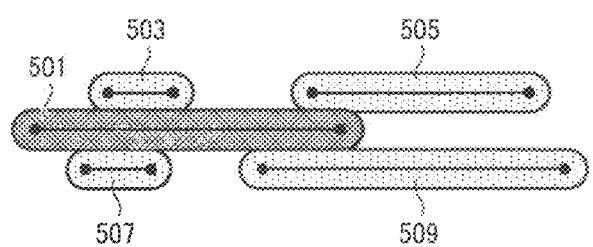
FIG. 15A is a diagram illustrating an example of a drawing stroke.

FIG. 15A is a diagram illustrating an example of a drawing stroke. Here, reference will be made to an example of detection of a noncontact portion in a stroke 501 shown in FIG. 15A. The second detecting unit 443 detects a portion where a distance between a center line of the stroke 501 and a center line of a stroke 503 is equal to or smaller than the line width, or, in short, a contact portion which is in contact with the stroke 503. The second detecting unit 443 temporarily records coordinates of a start point and an end point of the contact portion in the storage unit 120. The second detecting unit 443 also performs similar processes with respect to a stroke 505, a stroke 507, and a stroke 509. The second detecting unit 443 detects a noncontact portion or noncontact portions where at least one of an upper portion and a lower portion of the stroke 501 is out of contact with the other strokes, based on the coordinates recorded in the storage unit 120. The second detecting unit 443 also detects longitudinal end portions of the stroke 501 as noncontact portions.

Figure 15B:
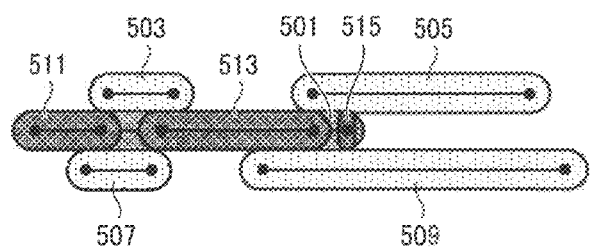
FIG. 15B is a diagram illustrating a stroke in which non-contact portions where the stroke is out of contact with other strokes have been detected.

FIG. 15B is a diagram illustrating an example of the stroke 501 where noncontact portions, at each of which the stroke 501 is out of contact with another stroke, are detected. In the example illustrated in FIG. 15B, the second detecting unit 443 detects noncontact portions 511, 513, and 515 in the stroke 501.

Referring back to FIG. 13, the drawing-instruction generating unit 444 generates a drawing instruction for drawing each stroke belonging to the drawing stroke such that energy to draw the noncontact portions detected by the second detecting unit 443 is greater than energy to draw the other portions.

Figures 16A, 16B:
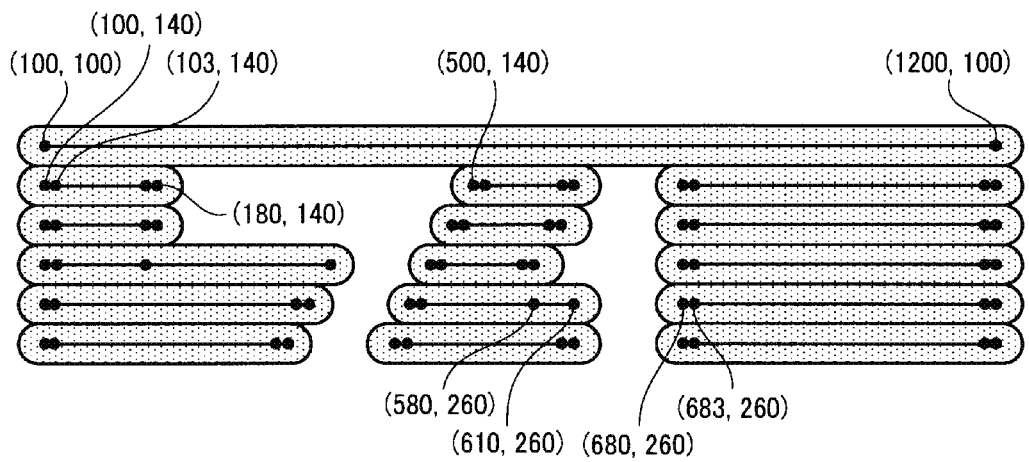
FIG. 16A is a diagram illustrating an example of a drawing stroke.
FIG. 16B is a diagram illustrating an example of a drawing instruction.

FIG. 16A is a diagram illustrating an example of a drawing stroke. FIG. 16B is a diagram illustrating a drawing instruction for drawing the drawing stroke illustrated in FIG. 16A. In the drawing instruction shown in FIG. 16B, an instruction code "p" is an instruction that changes irradiation intensity of laser light to intensity specified by a parameter expressed as a percentage. In the example illustrated in FIG. 16B, the drawing-instruction generating unit 444 generates a drawing instruction such that the irradiation intensity for the noncontact portions is set to be 105% and the irradiation intensity for the other portions is set to be 100%. More specifically, the drawing-instruction generating unit 444 divides each stroke belonging to the drawing stroke into separate line segments depending on noncontact portions and contact portions, and generates a drawing instruction such that the irradiation intensity for the line segments of the noncontact portions is set to 105% and the irradiation intensity for the line segments of the contact portions is set to 100%.

When the drawing control unit 146 controls the laser-light emitting device 150 to draw the drawing stroke shown in FIG. 16A on the thermal rewritable medium 170 using the drawing instruction shown in FIG. 16B, the laser-light emitting device 150 sets line width of a stroke to 40. Subsequently, the laser-light emitting device 150 moves an irradiation position of laser light to a point (100, 100), sets the irradiation intensity of laser light to 105%, and draws a stroke from the point (100, 100) to a point (1200, 100). Subsequently, the laser-light emitting device 150 moves the irradiation position of laser light to a point (100, 140) and, after standing by for a period of time corresponding to "50," draws a stroke from the point (100, 140) to a point (103, 140). Subsequently, the laser-light emitting device 150 sets the irradiation intensity of laser light to 100%, and draws a stroke from the point (103, 140) to a point (180, 140). Thereafter, the laser-light emitting device 150 continues to perform operations according to the drawing instruction, whereby a sharply outlined hollow character string is drawn (formed) on the thermal rewritable medium 170.

Next, reference will be made to an operation of the laser-light emitting system according to the second embodiment.

Figure 17:
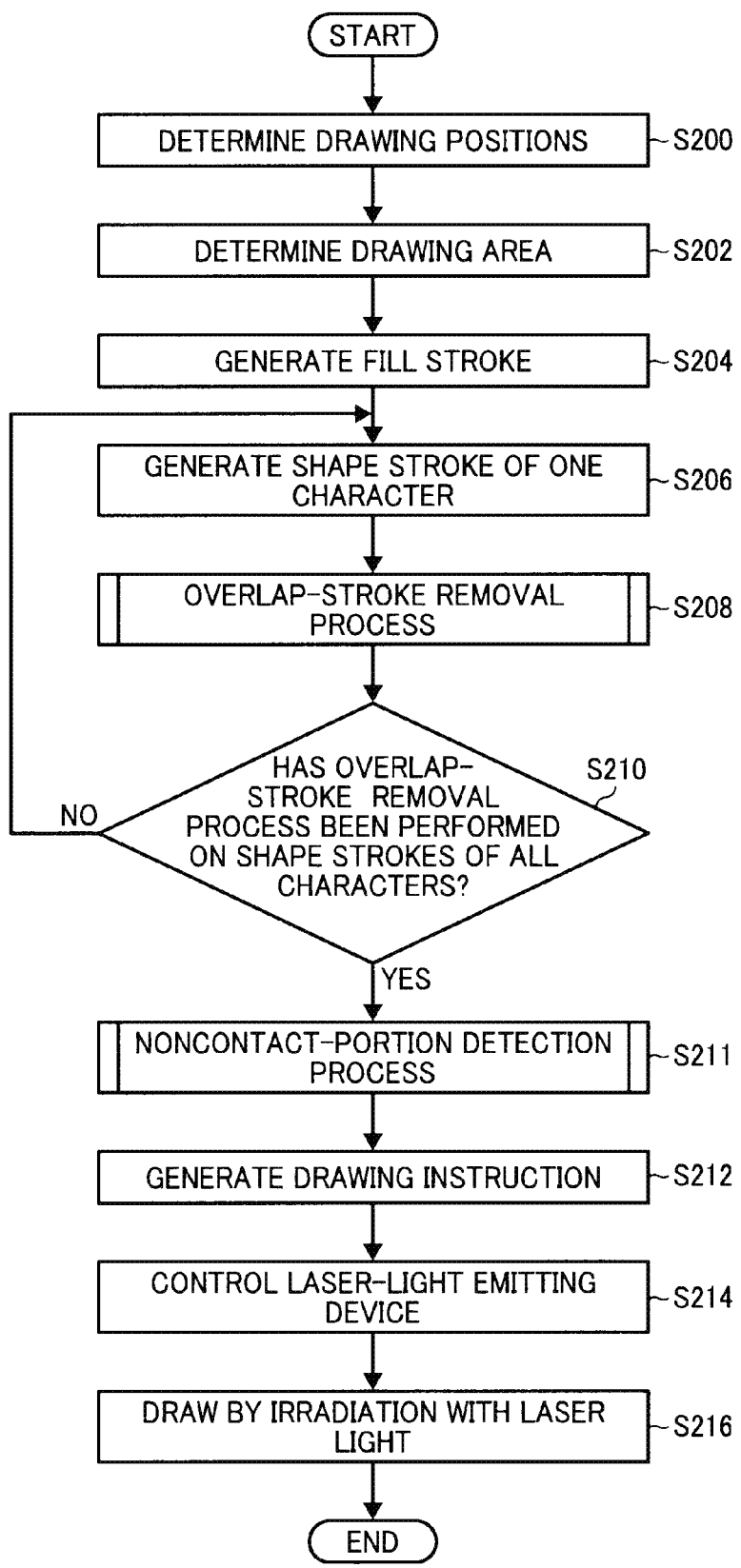
FIG. 17 is a flowchart of an exemplary process which is performed by the laser-light emitting system according to the second embodiment.

FIG. 17 is a flowchart of an exemplary process which is performed by the laser-light emitting system 400 according to the second embodiment. Here, a character string is taken as an example of a shape to be drawn.

Processes from Step S200 to Step S210 are similar to the processes from Step S100 to Step S110 shown in FIG. 11, respectively.

Upon completion of the overlap-stroke removal processes for the shape strokes of all the characters in the character string (YES at Step S210), the second detecting unit 443 performs a noncontact-portion detection process in which the second detecting unit 443 detects, for each of the strokes belonging to the drawing stroke, a noncontact portion that is a portion out of contact with another stroke belonging to the drawing stroke (Step S211). The noncontact-portion detection process will be described in detail later.

Subsequently, the drawing-instruction generating unit 444 generates a drawing instruction for drawing each stroke belonging to the drawing stroke modified by the modifying unit 142 such that energy to draw the noncontact portions detected by the second detecting unit 443 is greater than energy to draw the other portions (Step S212).

Processes of Step S214 and Step S216 are similar to the processes of Step S114 and Step S116.

Figure 18:
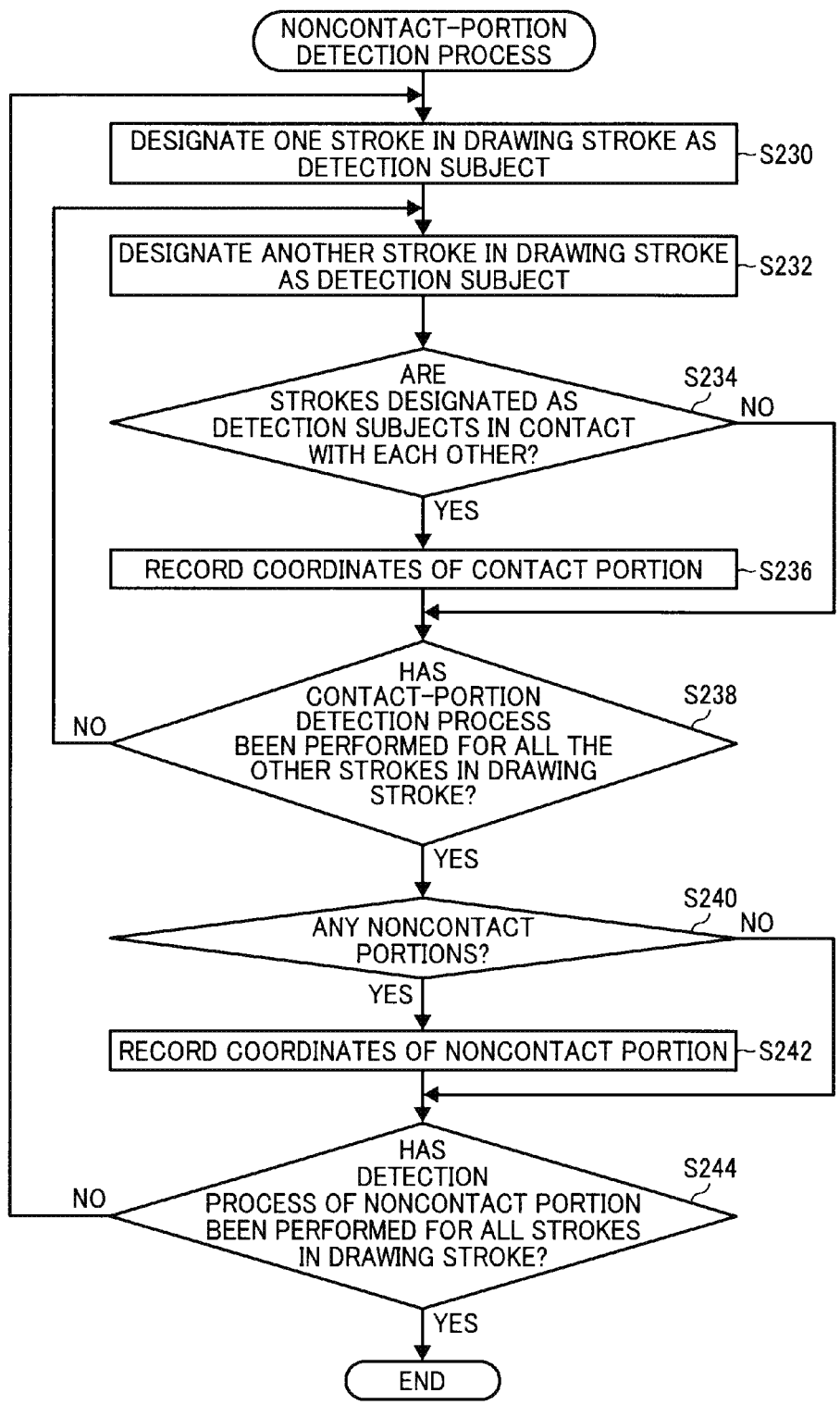
FIG. 18 is a flowchart of an exemplary process for noncontact-portion detection which is performed by the laser-light emitting system according to the second embodiment.

FIG. 18 is a flowchart illustrating an example of the noncontact-portion detection process which is performed at Step S211 in the flowchart illustrated in FIG. 17.

The second detecting unit 443 designates one stroke in the drawing stroke as a noncontact-portion detection subject (Step S230).

The second detecting unit 443 designates another stroke in the drawing stroke as a noncontact-portion detection subject (Step S232).

Subsequently, the second detecting unit 443 determines whether the both strokes designated as the noncontact-portion detection subjects are in contact with each other (Step S234).

If the both strokes are determined to be in contact with each other (YES at Step S234), the second detecting unit 443 records coordinates of a contact portion in the one stroke (Step S236). If the both strokes are determined not to be in contact with each other (NO at Step S234), the second detecting unit 443 skips the process of Step S236.

Step S232 to Step S238 are repeated until the contact-portion detection processes between one stroke in the drawing stroke and all the other strokes in the drawing stroke are completed (NO at Step S238).

Upon completion of the contact-portion detection processes between one stroke in the drawing stroke and all the other strokes in the drawing stroke (YES at Step S238), the second detecting unit 443 determines whether there are any noncontact portions in the one stroke in the drawing stroke, based on the coordinates of all the contact portions in the one stroke (Step S240).

If there is a noncontact portion in the one stroke (YES at Step S240), the second detecting unit 443 records coordinates of the noncontact portion (Step S242). If there is no noncontact portion in the one stroke (NO at Step S240), the second detecting unit 443 skips the process of Step S242.

Step S230 to Step S244 are repeated until the noncontact portion detection processes for all the strokes in the drawing stroke are completed (NO at Step S244). Upon completion of the noncontact portion detection processes for all the strokes in the drawing stroke (YES at Step S244), the noncontact-portion detection process performed by the second detecting unit 443 ends.

As described above, in the second embodiment, irradiation intensity (power) of laser light for drawing a noncontact portion in a drawing stroke is higher than that for drawing the other portions. This allows boundaries of a brightness-inverted shape to be sharply outlined, thereby improving quality (image quality).

In the second embodiment, the irradiation intensity for noncontact portions is set to be uniform. The irradiation intensity may vary depending on the number of noncontact portions. For instance, when another stroke is neither on an upper side nor a lower side of one stroke, heat is likely to dissipate to the surroundings of the one stroke as compared to one stroke that is adjacent to another stroke at any one of upper side and lower side of the one stroke. In view of this, the irradiation intensity may be higher as the number of noncontact portions increases.

Third Embodiment

In the first embodiment, the example where only a drawing stroke is drawn has been described. If line width (width of a color developing area) is relatively thick, jaggies on boundaries of a brightness-inverted shape is likely to become noticeable. In view of the circumstances, in a third embodiment of the present invention, an outline stroke which is a stroke outlining a shape stroke is generated, and in addition to a drawing stroke, the outline stroke is drawn. Difference between the third embodiment and the first embodiment will be primarily described below. The same reference numerals and the same name will be given without adding explanations for those configurations that are the same as the first embodiment.

Figure 19:
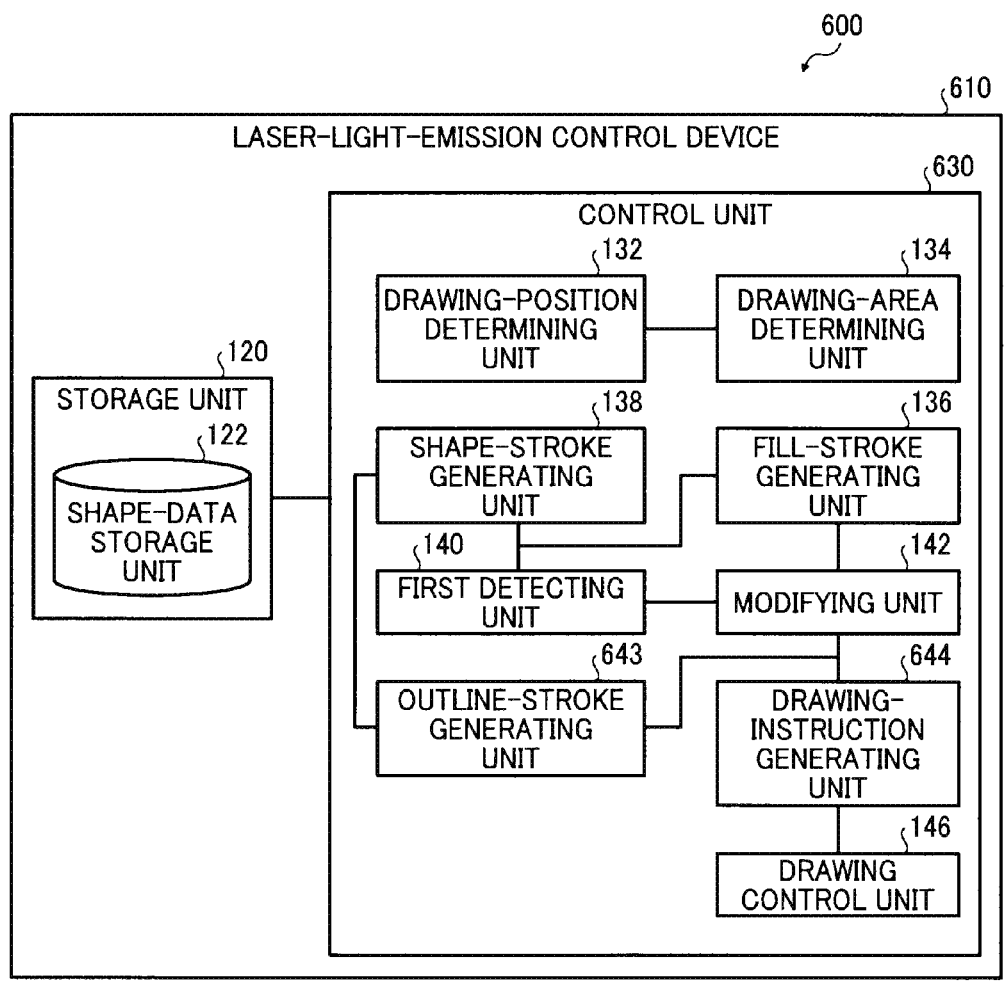
FIG. 19 is a block diagram illustrating an exemplary functional configuration of a laser-light-emission control device according to a third embodiment of the present invention.

FIG. 19 is a block diagram illustrating an exemplary functional configuration of a laser-light-emission control device 610 according to the third embodiment. The laser-light-emission control device 610 in a laser-light emitting system 600 of the third embodiment differs from the laser-light-emission control device 110 of the first embodiment in that a control unit 630 additionally includes an outline-stroke generating unit 643. In addition, a process performed by a drawing-instruction generating unit 644 differs from the process performed by the drawing-instruction generating unit 144. These functional units will be described below.

Figure 20A:
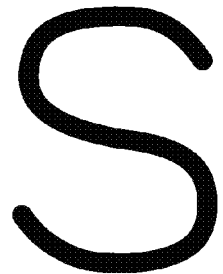
FIG. 20A is a diagram illustrating an example of a shape stroke.
Figure 20B:
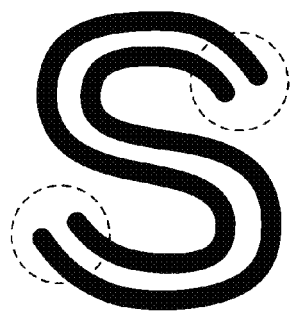
FIG. 20B is a diagram illustrating an example of an outline stroke.
Figure 20C:
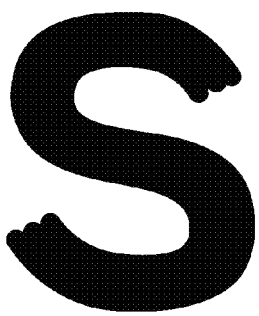
FIG. 20C is a diagram illustrating an example of a thick stroke.

The outline-stroke generating unit 643 generates an outline stroke which is a stroke outlining a shape stroke. For example, if the shape-stroke generating unit 138 generates the shape stroke illustrated in FIG. 20A, the outline-stroke generating unit 643 generates, as illustrated in FIG. 20B, an outline stroke adjacent to the shape stroke of FIG. 20A. More specifically, the outline-stroke generating unit 643 generates a thick stroke by arranging a plurality of strokes which are parallel to the shape stroke and adjacent to the shape stroke. The outline-stroke generating unit 643 then removes all but outermost strokes from the thick stroke, thereby generating the outline stroke. For instance, as illustrated in FIG. 20C, the outline-stroke generating unit 643 generates a thick stroke by arranging two strokes parallel to the shape stroke illustrated in FIG. 20A, and removes all but outermost strokes, in other words, removes the shape stroke at the center, thereby generating the outline stroke illustrated in FIG. 20B.

Figure 20D:
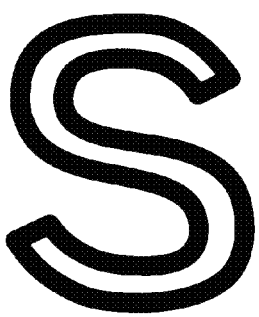
FIG. 20D is a diagram illustrating another example of an outline stroke.

As illustrated in FIG. 20D, the outline-stroke generating unit 643 may generate an outline stroke with closed ends by closing the both ends of the outline stroke of FIG. 20B. More specifically, the outline-stroke generating unit 643 may generate additional end strokes at free end portions of the outline stroke (indicated by dotted circles in FIG. 20B) which are not connected to the other stroke such that the end strokes are perpendicular to the outline stroke. For instance, within a distance of thickness of a thick stroke from one free end portion of the outline stroke, the outline-stroke generating unit 643 detects another free end portion of the outline stroke. The outline-stroke generating unit 643 sets coordinates of an end stroke at positions, each of which does not overlap with each of the free end portions. The outline-stroke generating unit 643 thus generates the end stroke that is perpendicular to the outline stroke at one end of the outline stroke.

Referring back to FIG. 19, the drawing-instruction generating unit 644 generates a drawing instruction for drawing a drawing stroke and an outline stroke in the order of the drawing stroke and the outline stroke or in the order of the outline stroke and the drawing stroke. In the third embodiment, the drawing-instruction generating unit 644 generates a drawing instruction that defines a standby time between drawing of the drawing stroke and drawing of the outline stroke.

Figures 21A, 21B:
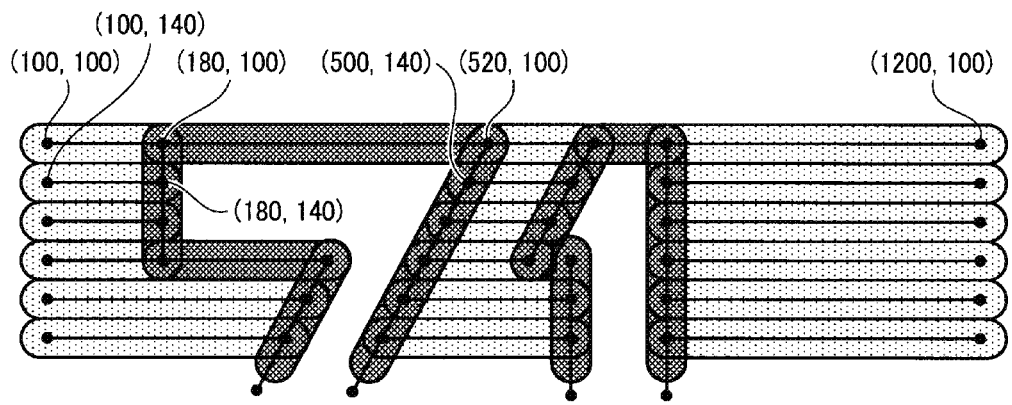
FIG. 21A is a diagram illustrating a drawing stroke and an outline stroke that are arranged in a drawing area in an overlapping manner.
FIG. 21B is a diagram illustrating an example of a drawing instruction.

FIG. 21A is a diagram illustrating a drawing stroke and an outline stroke that are arranged in a drawing area in an overlapping manner. FIG. 21B is a diagram illustrating a drawing instruction for drawing the drawing stroke and the outline stroke illustrated in FIG. 21A. In the example shown in FIG. 21B, the drawing-instruction generating unit 644 generates a drawing instruction that defines a standby time "300" between drawing of the drawing stroke and drawing of the outline stroke.

When the drawing control unit 146 controls the laser-light emitting device 150 to draw the drawing stroke and the outline stroke illustrated in FIG. 21A on the thermal rewritable medium 170 using the drawing-instruction shown in FIG. 21B, the drawing control unit 146 sets line width of the stroke to 40. Subsequently, the laser-light emitting device 150 moves an irradiation position of laser light to a point (100, 100) and draws a stroke from the point (100, 100) to a point (1200, 100). Subsequently, the laser-light emitting device 150 moves the irradiation position of laser light to a point (100, 140) and, after standing by for a period of time corresponding to "50," draws a stroke from the point (100, 140) to a point (180, 140). Thereafter, the laser-light emitting device 150 continues to perform operations according to the drawing instruction, whereby the drawing stroke is drawn (formed) on the thermal rewritable medium 170.

Thereafter, the laser-light emitting device 150 is on standby for a period of time corresponding to "300." Subsequently, the laser-light emitting device 150 moves the irradiation position of laser light to a point (180, 100) and, after standing by for a period of time corresponding to "50," draws a stroke from the point (180, 100) to a point (520, 100). Thereafter, the laser-light emitting device 150 continues to perform operations according to the drawing instruction, whereby the outline stroke is drawn (formed) on the thermal rewritable medium 170.

Figure 22:
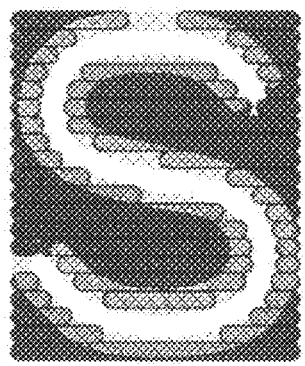
FIG. 22 is a diagram illustrating an example of a drawing stroke and an outline stroke that are to be drawn on a thermal rewritable medium in an overlapping manner.
Figure 23:
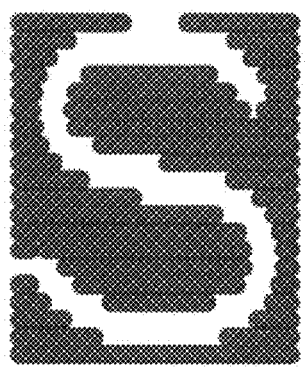
FIG. 23 is a diagram illustrating an example of the drawing stroke.

FIG. 22 is a diagram illustrating an example of a drawing stroke and an outline stroke to be drawn on the thermal rewritable medium 170 in an overlapping manner. In the example illustrated in FIG. 22, the drawing stroke illustrated in FIG. 23 and the outline stroke illustrated in FIG. 20B are drawn in an overlapping manner. In the drawing stroke illustrated in FIG. 23, strokes are drawn in an overlapping manner.

Next, reference will be made to an operation of the laser-light emitting system according to the third embodiment.

Figure 24:
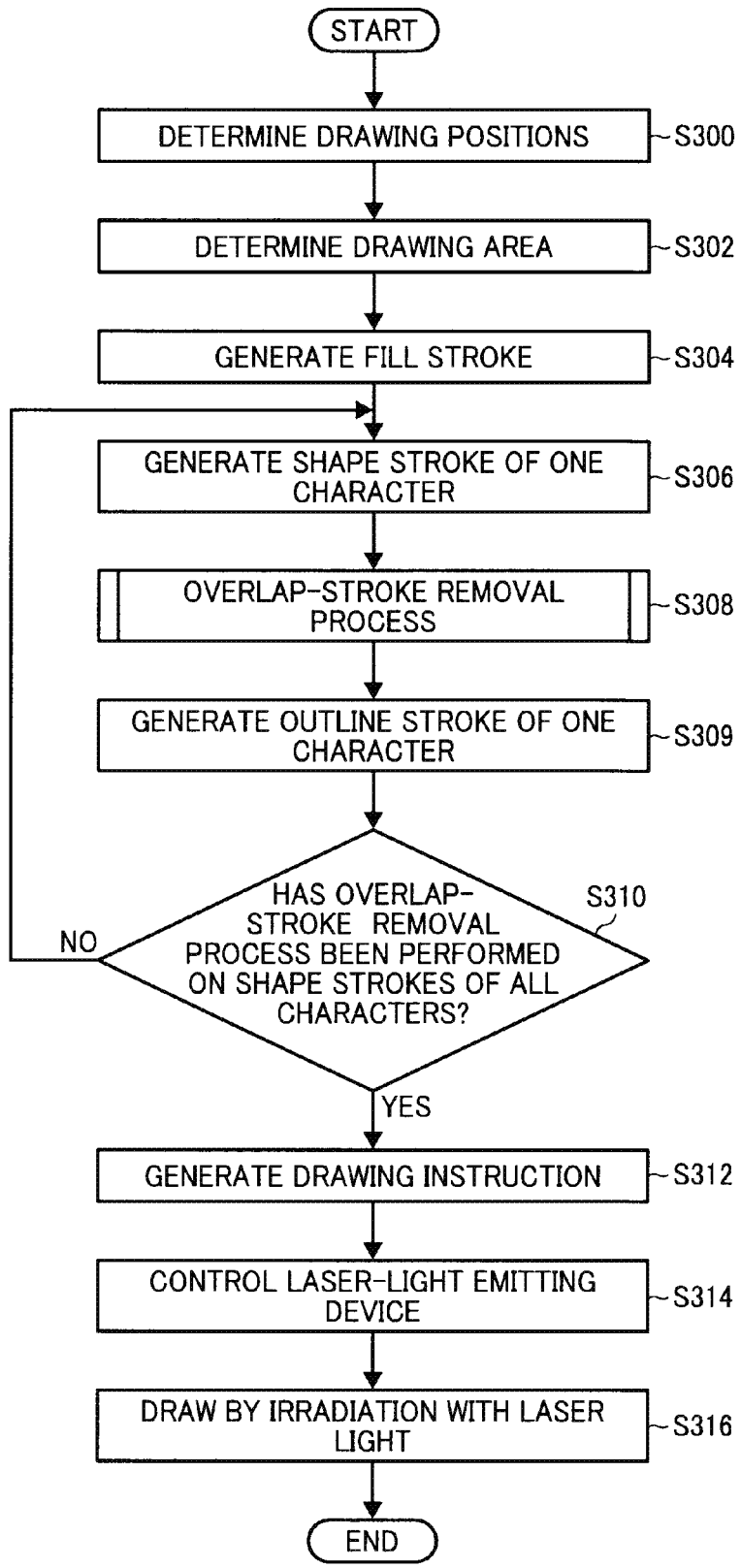
FIG. 24 is a flowchart of an exemplary process which is performed by the laser-light emitting system according to the third embodiment.

FIG. 24 is a flowchart of an exemplary process which is performed by the laser-light emitting system 600 according to the third embodiment. Here, a character string is taken as an example of a shape to be drawn.

Processes from Step S300 to Step S308 are similar to the processes from Step S100 to Step S108 of FIG. 11.

Upon completion of the overlap-stroke removal process at Step S308, the outline-stroke generating unit 643 generates an outline stroke which is a stroke outlining the shape stroke generated by the shape-stroke generating unit 138 (Step S309).

Step S306 to Step S310 are repeated until the overlap-stroke removal processes for shape strokes of all the characters in the character string are completed (NO at Step S310).

Upon completion of the overlap-stroke removal processes for the shape strokes of all the characters in the character string (YES at Step S310), the drawing-instruction generating unit 644 generates a drawing instruction for drawing the drawing stroke modified by the modifying unit 142 and the outline stroke generated by the outline-stroke generating unit 643 in the order of the drawing stroke and the outline stroke or otherwise (Step S312).

Processes of Step S314 and Step S316 are similar to the processes of Step S114 and Step S116, respectively.

As described above, in the third embodiment, in addition to a drawing stroke, an outline stroke that fills jaggies on boundaries of the drawing stroke is drawn. This makes the boundaries of the brightness-inverted shape smooth, thereby improving quality (image quality).

Moreover, a standby time is set between the drawing of the drawing stroke and the drawing of the outline stroke. This allows the outline stroke to be drawn after heat produced by the drawing of the drawing stroke is sufficiently dissipated. Accordingly, the temperature of the thermal rewritable medium does not increase than required, and degradation of the medium is prevented.

Hardware Configuration

Next, a hardware configuration of the laser-light-emission control device according to the first, second, and third embodiment will be described below.

Figure 25:
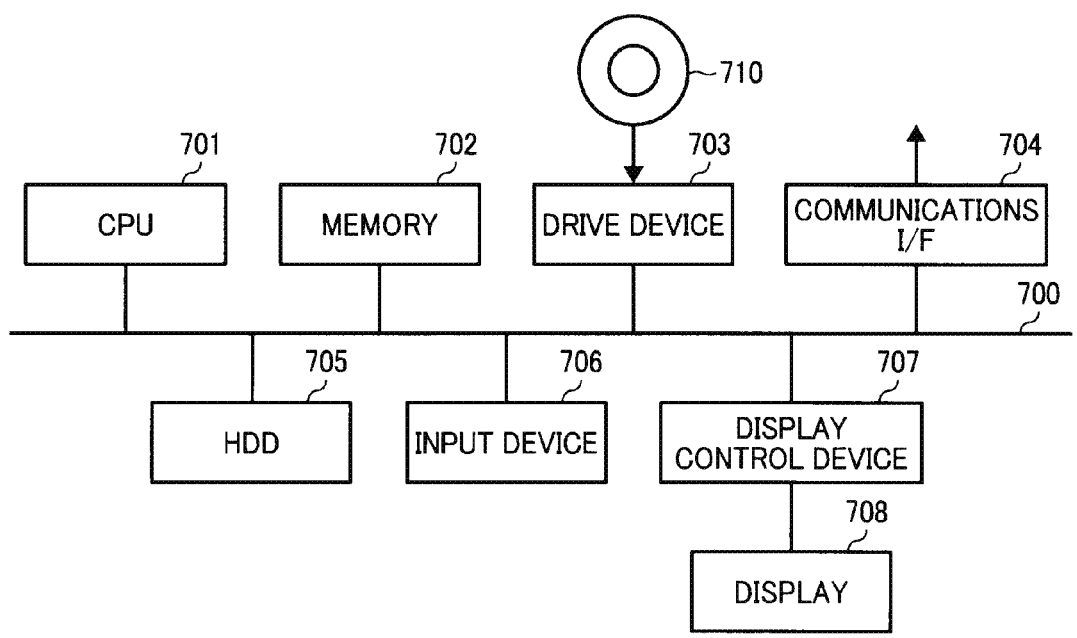
FIG. 25 is a block diagram illustrating an example hardware configuration of the laser-light-emission control device according to the first to third embodiments.

FIG. 25 is a block diagram illustrating an example configuration of the laser-light-emission control device 110, 410, 610 according to the first, second, third embodiment. The laser-light-emission control device 110, 410, 610 includes a bus 700, and a CPU 701, memory 702, such as dynamic RAM (DRAM), a drive device 703, a communications interface (I/F) 704, an HDD 705, an input device 706, and a display control device 707 that are connected to the bus 700. The units connected to the bus 700 are configured to be capable of communications with each other via the bus 700.

The HDD 705 stores, in advance, computer-readable program codes and various data for operations by the CPU 701, font data, such as characters and symbols. The HDD 705 also stores computer-readable control program codes for controlling the laser-light emitting device 150. The CPU 701 controls the laser-light emitting system 100, 400, and 600 according to the program codes read out from the HDD 705 while using the memory 702 as working memory.

A detachable storage medium 710 is mountable in the drive device 703 to read out data from the storage medium 710. Examples of the storage medium 710 supported by the drive device 703 include disk storage media, such as a compact disc (CD) and a digital versatile disc (DVD), and rewritable nonvolatile semiconductor memory (e.g., electrically erasable programmable ROM (EEPROM)).

The control program codes and the font data to be stored in the HDD 705 can be recorded in the storage medium 710, for instance. The drive device 703 reads out the control program codes and the font data from the storage medium 710 and stores the same in the HDD 705, whereby the control program codes are mounted on the laser-light-emission control device 110, 410, 610.

The communications I/F 704 is an interface between the laser-light-emission control device 110, 410, 610 and the laser-light emitting device 150. The CPU 701 carries out communications with the laser oscillator 152 and the directional control motor 158 via the communications I/F 704 to control the laser oscillator 152 and the directional control motor 158. The communications I/F 704 is adaptable to, for instance, serial interface, such as the Institute of Electrical and Electronics Engineers (IEEE) 1394 and universal serial bus (USE), and controls the laser-light emitting device 150 via the serial interface. Meanwhile, interface adaptable to the communications I/F 704 is not limited to cable communication, and wireless communication, such as wireless USE and Bluetooth (registered trademark), is also adaptable. The laser-light-emission control device 110, 410, 610 and the laser-light emitting device 150 can be configured in a single casing. In this case, the communications I/F 704 can be configured as an interface for internal communications.

The input device 706 outputs control signals to the CPU 701 according to user operation. The CPU 701 controls the laser-light emitting systems 100, 400, and 600 according to the control signals from the input device 706, based on the program codes, to operate the laser-light emitting systems 100, 400, and 600 in accordance with the user operation.

The display control device 707 is connected to a display 708 that includes and uses a liquid crystal display (LCD) or the like as a display device. The display control device 707 converts display control signals, which are generated by the CPU 701 according to the program codes, into signals for providing visual representation on the display 708, and transmits the signals to the display 708. A graphical user interface (GUI) for use in operating the laser-light emitting systems 100, 400, and 600 can be provided by using visual representation on the display 708 and the input device 706. The GUI allows, for instance, an entry field for use in entering a character or a signal to be drawn on the thermal rewritable medium 170 to be displayed on the display 708. A user is prompted to input a character or a signal from the input device 706 according to guidance provided by the GUI.

Data of shape, such as a character and/or a symbol, to be drawn on the thermal rewritable medium 170 can be stored in the HDD 705 in a form of list, or, can be entered through the input device 706. The shape is specified by a character code, such as Unicode or JIS code. The laser-light-emission control device 110, 410, 610 controls the laser-light emitting device 150 by reading font data for the character code from the HDD 705 and converting the font data into a drawing instruction.

Drawing program codes which are executed by the laser-light-emission control devices 110, 410, and 610 according to the first, second, and third embodiments can be stored in advance in ROM in the memory 702.

Alternatively, the drawing program codes which are executed by the laser-light-emission control devices 110, 410, and 610 according to the first, second, and third embodiments may be recorded in a computer-readable storage medium, such as a CD-ROM, a flexible disk (FD), a CD recordable (CD-R), or a DVD, in an installable or executable format.

The drawing program codes which are executed by the laser-light-emission control devices 110, 410, and 610 according to the first, second, and third embodiments may be stored in a computer connected to a network such as the Internet so that the program codes can be downloaded via the network. Alternatively, the drawing program codes which are executed by the laser-light-emission control devices 110, 410, and 610 according to the first, second, and third embodiment may be provided or distributed via a network such as the Internet.

Each of the drawing program codes which are executed by the laser-light-emission control devices 110, 410, and 610 according to the first, second, and third embodiments has a configuration of module that causes the above-described units to be implemented on a computer. From a viewpoint of actual hardware, the CPU 701 reads the drawing program code from the ROM in the memory 702 and loads the same into the DRAM in the memory 702 to execute the program code, whereby the above-described units can be implemented on the computer.

According to the present invention, it is possible to draw a brightness-inverted shape with reduced drawing time.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A drawing control device comprising:
    a fill-stroke generating unit that generates a fill stroke that includes a plurality of strokes that fill a drawing area;

a shape-stroke generating unit that generates a shape stroke, said shape stroke being a stroke of a shape to be formed on the drawing area;

a first detecting unit that detects an overlap portion where the fill stroke and the shape stroke overlap with each other;

a modifying unit that removes the overlap portion from the fill stroke to modify the fill stroke and that removes the shape stroke to obtain a drawing stroke;

a drawing-instruction generating unit that generates a drawing instruction for drawing each stroke in the drawing stroke; and a drawing control unit that controls a drawing device, by using the drawing instruction, to cause the drawing device to draw the drawing stroke on an object, the drawing device being a device for drawing visual information on the object by transferring energy to the object.

2. The drawing control device according to claim 1, further comprising a second detecting unit that detects, for each stroke in the drawing stroke, a noncontact portion that is a portion out of contact with another stroke in the drawing stroke, wherein the drawing-instruction generating unit generates the drawing instruction such that energy to draw the noncontact portion is greater than energy to draw a contact portion in said each stroke in the drawing stroke.

3. The drawing control device according to claim 1, further comprising an outline-stroke generating unit that generates an outline stroke which is a stroke outlining the shape stroke, wherein the drawing-instruction generating unit generates the drawing instruction for drawing the drawing stroke and the outline stroke in this order or otherwise.

4. The drawing control device according to claim 3, wherein the drawing-instruction generating unit generates the drawing instruction that defines a standby time between drawing of the drawing stroke and drawing of the outline stroke.

5. The drawing control device according to claim 1, wherein the drawing area includes a margin area that surrounds an area where the shape stroke is to be drawn, the margin area being equal to or wider than line width of the shape stroke.

6. A laser-light emitting system comprising:
the drawing control device according to claim 1; and
the drawing device that includes:
   a laser oscillator that oscillates laser light according to the drawing instruction;
   a directional control mirror that controls an irradiation direction of the laser light; and
   a directional control motor that drives the directional control mirror according to the drawing instruction, thereby causing the object to be irradiated with the laser light.

7. The drawing control device according to claim 1, wherein the fill-stroke generating unit generates fill stroke data indicating a start point and an end point of each of the plurality of strokes in the fill stroke.

8. The drawing control device according to claim 1, wherein shape stroke generating unit obtains shape data indicating the shape to be formed on the drawing area from a shape-data storage unit and generates shape stroke data indicating a start point and an end point of all strokes in the shape stroke.

9. The drawing control device of claim 1, wherein the overlap portion is detected based on a distance between a first center line of one of the plurality of strokes in the fill stroke and a second center line in the shape stroke.

10. The drawing control device of claim 9, wherein the first detecting unit detects the overlap portion when the distance is equal to or smaller than a line width of the shape stroke.

11. The drawing control device of claim 1, wherein the drawing control unit controls the drawing device, by using the drawing instruction, to cause the drawing device to draw the drawing stroke on the object while excluding an area corresponding to the shape stroke.

12. The drawing control device of claim 1, wherein the drawing control unit controls the drawing device to exclude transfer of energy to an area corresponding to the shape stroke.

13. A drawing method comprising:
generating, by a fill-stroke generating unit, a fill stroke that includes a plurality of strokes that fill a drawing area;
generating, by a shape-stroke generating unit, a shape stroke, said shape stroke being a stroke of a shape to be formed on the drawing area;
detecting, by a first detecting unit, an overlap portion where the fill stroke and the shape stroke overlap with each other;
modifying, by a modifying unit, the fill stroke to obtain a drawing stroke by removing the overlap portion from the fill stroke and by removing the shape stroke;
generating, by a drawing-instruction generating unit, a drawing instruction for drawing each stroke in the drawing stroke; and
controlling, by a drawing control unit, a drawing device by using the drawing instruction to cause the drawing device to draw the drawing stroke on an object, the drawing device being a device for drawing visual information on the object by transferring energy to the object.

14. A computer program product comprising a non-transitory computer-readable medium having computer-readable program codes embodied in the medium for processing information in a drawing control device that includes a fill-stroke generating unit, a shape-stroke generating unit, a first detecting unit, a modifying unit, a drawing-instruction generating unit, a drawing control unit, and a second detecting unit, the program codes when executed causing a computer to execute:
generating, by the fill-stroke generating unit, a fill stroke that includes a plurality of strokes that fill a drawing area;
generating, by the shape-stroke generating unit a shape stroke, said shape stroke being a stroke of a shape to be formed on the drawing area;
detecting, by the first detecting unit, an overlap portion where the fill stroke and the shape stroke overlap with each other;
modifying, by the modifying unit, the fill stroke to obtain a drawing stroke by removing the overlap portion from the fill stroke and by removing the shape stroke;
generating, by the drawing-instruction generating unit, a drawing instruction for drawing each stroke in the drawing stroke; and
controlling, by the drawing control unit, a drawing device by using the drawing instruction to cause the drawing device to draw the drawing stroke on an object, the drawing device being a device for drawing visual information on the object by transferring energy to the object.

* * * * *